United States Patent
Little et al.

(10) Patent No.: US 9,802,140 B2
(45) Date of Patent: *Oct. 31, 2017

(54) REMOTE SUBMERGED CHAIN CONVEYOR

(71) Applicant: Diamond Power International, Inc., Lancaster, OH (US)

(72) Inventors: Austin T. Little, Chillicothe, OH (US); Louis A. Zotti, King of Prussia, PA (US); Tony F. Habib, Lancaster, OH (US); Alan J. Dore, Haverford, PA (US)

(73) Assignee: DIAMOND POWER INTERNATIONAL, LLC, Lancaster, OH (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/826,806

(22) Filed: Aug. 14, 2015

(65) Prior Publication Data

US 2015/0352467 A1   Dec. 10, 2015

Related U.S. Application Data

(63) Continuation-in-part of application No. PCT/US2014/025892, filed on Mar. 13, 2014.

(Continued)

(51) Int. Cl.
  B01D 21/02   (2006.01)
  B01D 21/04   (2006.01)
  (Continued)

(52) U.S. Cl.
  CPC ........... B01D 21/04 (2013.01); B01D 21/003 (2013.01); B01D 21/0033 (2013.01);
  (Continued)

(58) Field of Classification Search
  CPC .............. B01D 21/003; B01D 21/0033; B01D 21/0042; B01D 21/0045; B01D 21/04;
  (Continued)

(56) References Cited

U.S. PATENT DOCUMENTS

| | | | | |
|---|---|---|---|---|
| 2,110,721 A | * | 3/1938 | Fischer | B01D 21/04 210/526 |
| 2,603,352 A | | 7/1952 | Tromp | |
| 2,868,384 A | * | 1/1959 | Puddington | B01D 21/0045 210/521 |
| 3,677,407 A | | 7/1972 | McIlvaine | |
| 3,795,316 A | | 3/1974 | Wood | |
| 3,923,659 A | * | 12/1975 | Ullrich | B01D 21/0045 210/521 |
| 3,932,280 A | * | 1/1976 | Anderson | F23J 1/02 210/526 |
| 4,178,243 A | * | 12/1979 | Messer | B01D 21/0045 210/710 |
| 4,515,607 A | * | 5/1985 | Wolde-Michael | B01D 19/00 210/526 |
| 4,536,286 A | * | 8/1985 | Nugent | C02F 1/5281 210/208 |

(Continued)

OTHER PUBLICATIONS

British Coal Corporation, "Removal of Ash from Industrial Boiler Plant using Water or Mechanical Equipment Submerged in Water," Commission of the European Communities, Technical Coal Research, 1992 [Retrieved on Jun. 10, 2014], Retrieved from the Internet: URL: http://bookshop.europa.eu/>, see entire document, especially pp. 10-14.

(Continued)

*Primary Examiner* — Christopher Upton
(74) *Attorney, Agent, or Firm* — Brinks Gilson & Lione

(57) ABSTRACT

A remote submerged chain conveyor system separates particles from a coal ash/water slurry from remotely located boiler units. A tank forms an ash holding section, a dewatering section, and an ash settling section. The ash holding section receives the slurry with first and second opposite ends. The dewatering section dewaters the slurry. The settling zone is an elongated trough connected with the ash holding section at one end with a discharge drain trough at near an opposite end. The tank sections are in a generally linear arrangement. A drag chain moves along the ash settling conveying the particles settling from the slurry to the dewatering section opposite to a net flow of water. A flocculant supply line upstream of the ash settling section configured for adding a flocculant promoting an agglomeration of particles into flocs. The flocculant supply line is located in a mixing section with an agitator.

19 Claims, 18 Drawing Sheets

Related U.S. Application Data

(60) Provisional application No. 61/792,088, filed on Mar. 15, 2013, provisional application No. 61/891,109, filed on Oct. 15, 2013.

(51) Int. Cl.
  *B01D 21/24* (2006.01)
  *B01D 21/01* (2006.01)
  *B01D 21/00* (2006.01)
  *B01D 21/28* (2006.01)
  *B01D 21/08* (2006.01)
  *F23J 1/02* (2006.01)
  *C02F 11/12* (2006.01)

(52) U.S. Cl.
  CPC ..... *B01D 21/0042* (2013.01); *B01D 21/0045* (2013.01); *B01D 21/01* (2013.01); *B01D 21/08* (2013.01); *B01D 21/2405* (2013.01); *B01D 21/2455* (2013.01); *B01D 21/2461* (2013.01); *B01D 21/286* (2013.01); *F23J 1/02* (2013.01); *C02F 11/123* (2013.01)

(58) Field of Classification Search
  CPC .... B01D 21/12; B01D 21/2455; B01D 21/01; B01D 21/08; B01D 21/16; B01D 21/286
  USPC .......... 210/803, 521, 526, 207, 208; 44/626, 44/627
  See application file for complete search history.

(56) References Cited

U.S. PATENT DOCUMENTS

| | | | |
|---|---|---|---|
| 4,804,147 A | | 2/1989 | Hooper |
| 5,013,440 A | | 5/1991 | Maddalena |
| 5,738,782 A | * | 4/1998 | Schafer .............. B01D 21/2455 210/521 |
| 9,345,992 B2 | * | 5/2016 | Little ................ B01D 21/0033 |
| 2002/0139754 A1 | | 10/2002 | Miller |
| 2004/0159608 A1 | | 8/2004 | Hoffland |
| 2007/0075024 A1 | * | 4/2007 | Campbell .......... B01D 21/0045 210/521 |
| 2009/0314726 A1 | * | 12/2009 | Ng ..................... B01D 21/2455 210/803 |
| 2010/0181537 A1 | | 7/2010 | Tsang et al. |
| 2011/0226194 A1 | | 9/2011 | Mooney |

OTHER PUBLICATIONS

U.S., International Search Report of International Application No. PCT/US2014/025892, dated Jul. 11, 2014 (1 page).

* cited by examiner

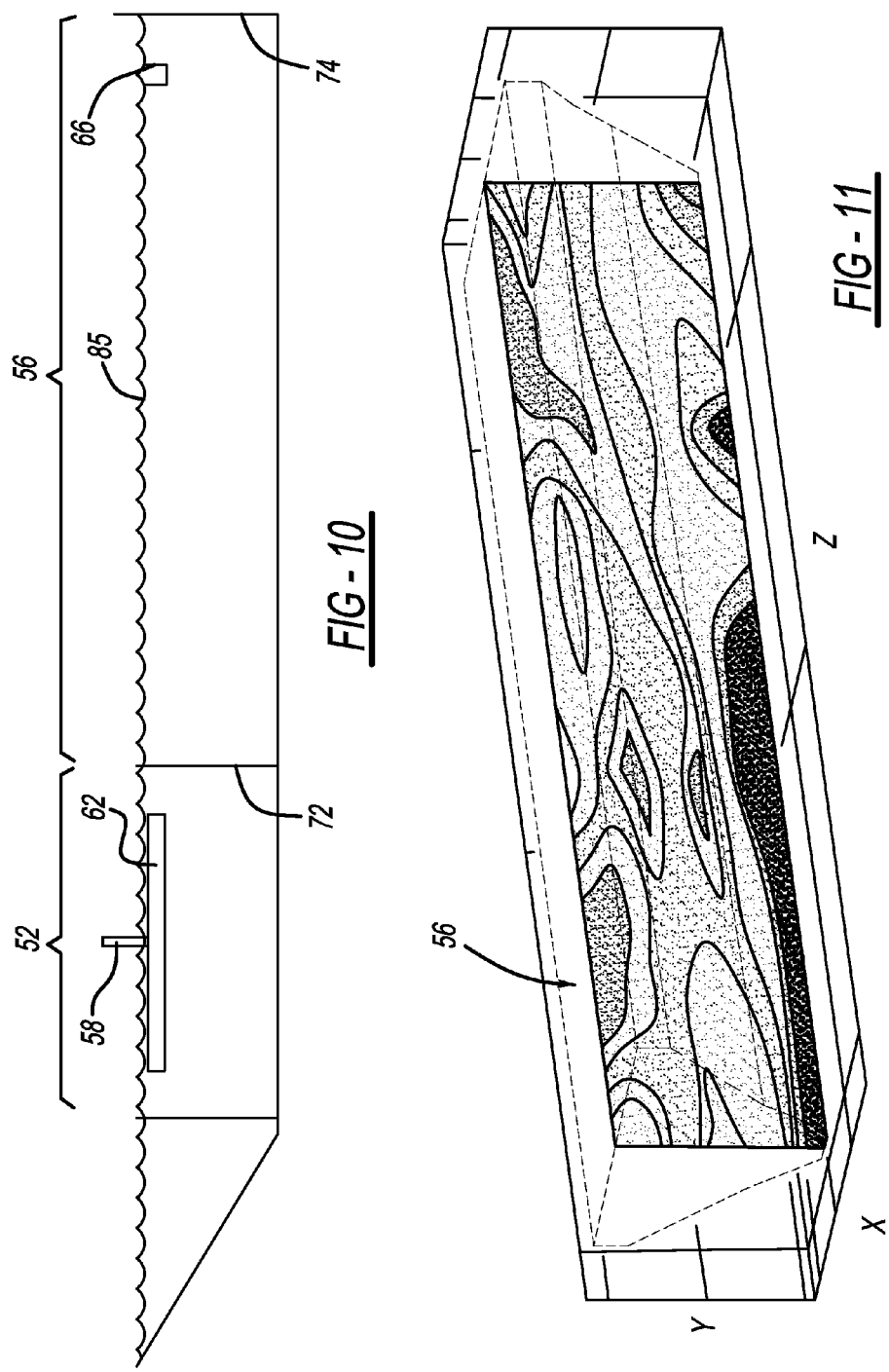

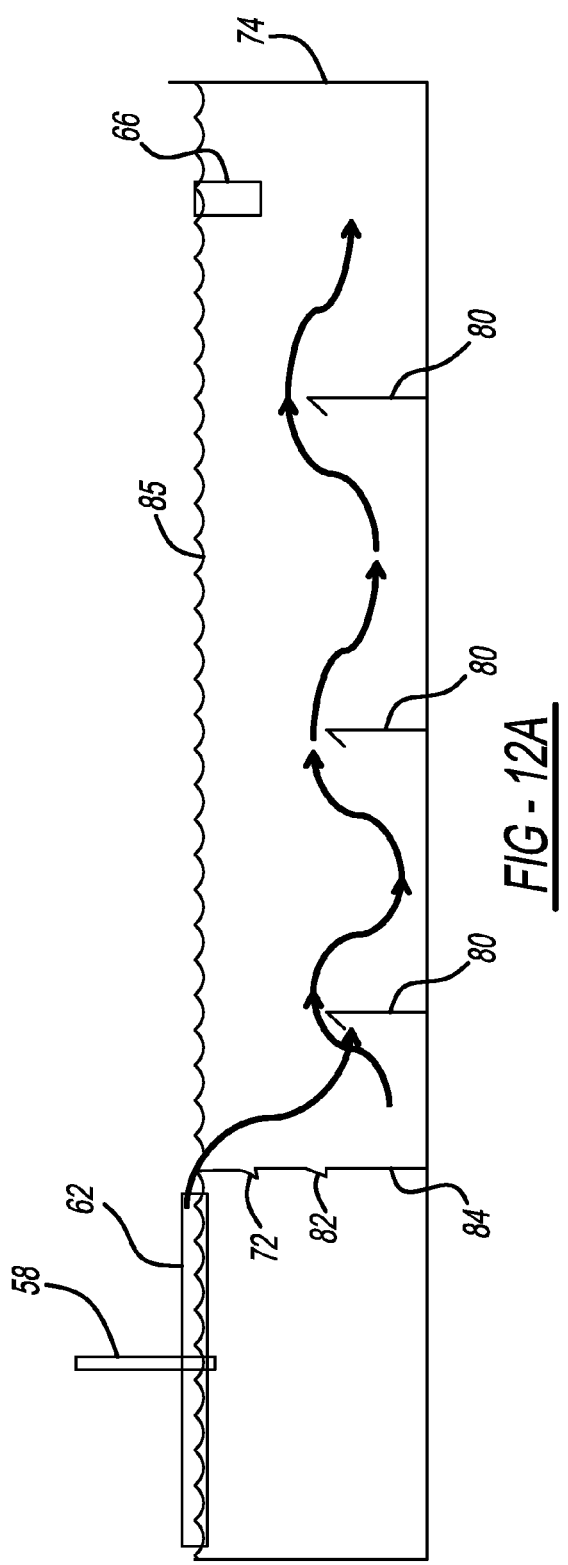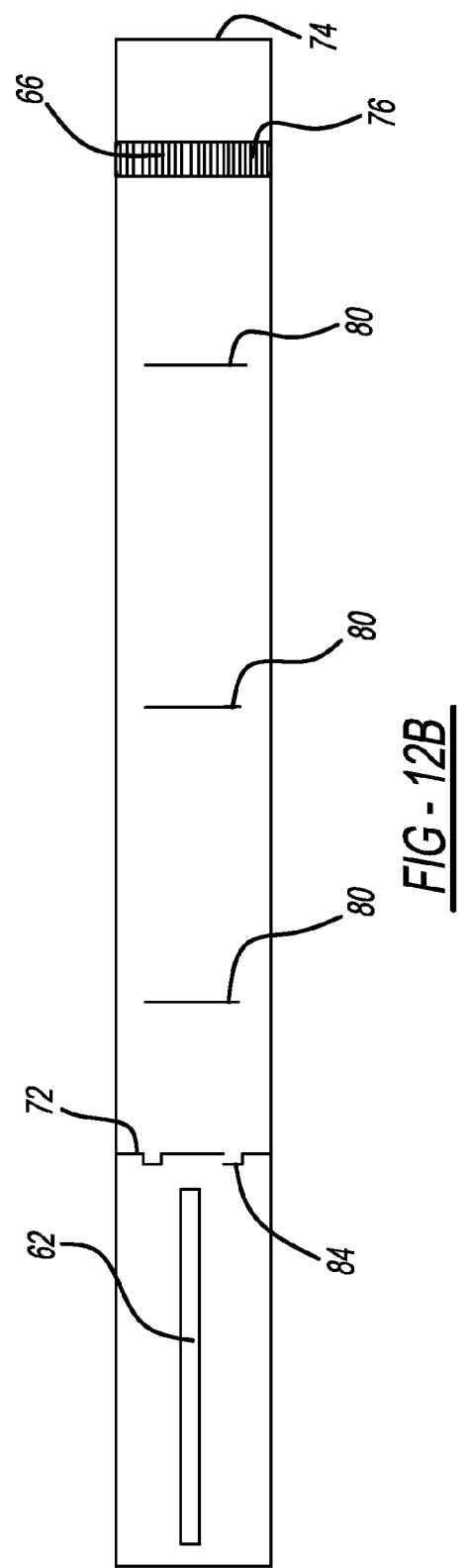

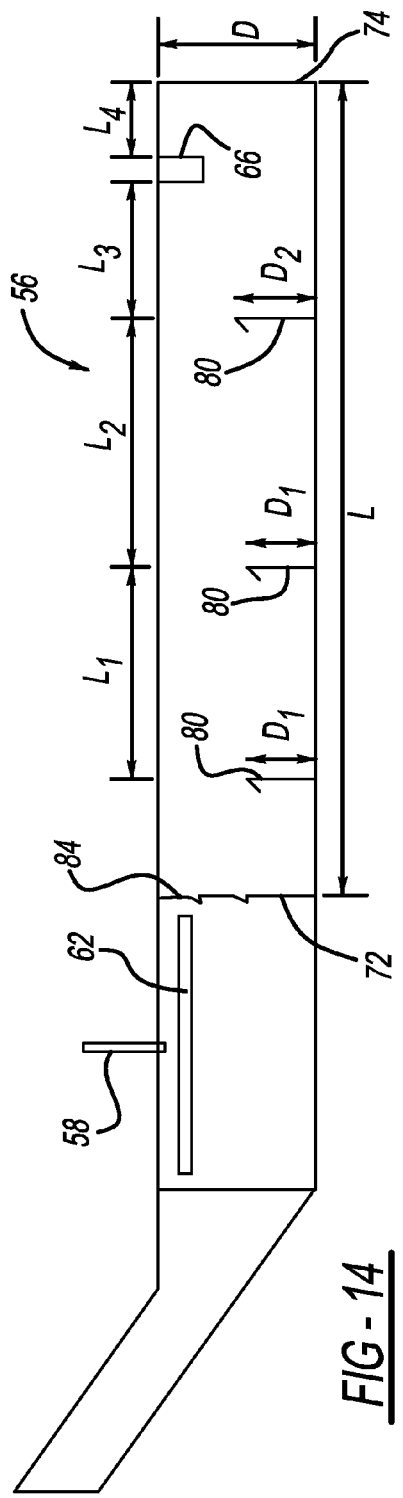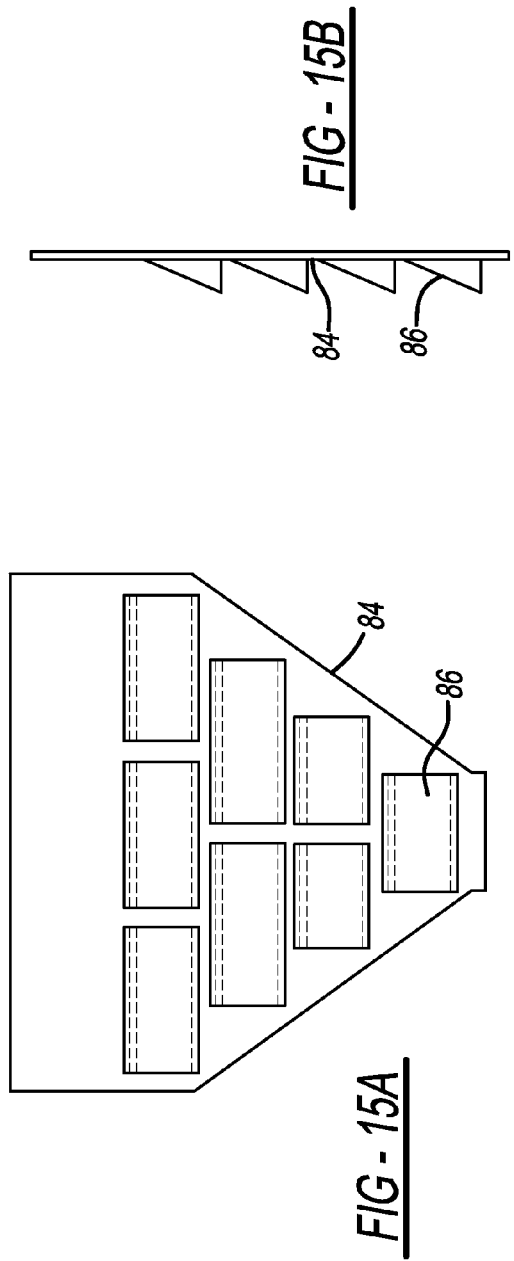

REMOTE SUBMERGED CHAIN CONVEYOR

CROSS-REFERENCE TO RELATED APPLICATIONS

This application is a Continuation-in-Part of International Application No. PCT/US2014/025892, filed on Mar. 13, 2014, which claims priority to U.S. provisional application Ser. No. 61/792,088 filed on Mar. 15, 2013, and U.S. provisional application Ser. No. 61/891,109 filed on Oct. 15, 2013, the contents of which are herewith incorporated by reference in their entirety.

FIELD OF THE INVENTION

This invention relates to a system for handling ash, and particularly to a remote submerged chain conveyor (RSCC) system for dewatering coal-ash/water slurries from large-scale coal combustion devices.

BACKGROUND OF THE INVENTION

The following description of general background of the present invention makes reference to drawing figures including FIGS. 1 through 4. The combustion process of coal in power utility fired boilers produces two types of waste products: 1) ash particles that are small enough to be entrained in the flue gas referred to as fly ash, and 2) relatively large ash particles that overcome drag in the combustion gases and drop to the bottom of the boiler referred to as bottom ash. Typically, bottom ash is either collected in a water impoundment or in a dry bottom. Water impounded ash, referred to as wet bottom ash, is typically collected in individual water filled hoppers, as shown in FIG. 1 which illustrates a typical bottom ash to pond system 10, or in a closed loop recirculation system 26 shown in FIG. 2, or in a water filled trough with a submerged drag chain system 12 as shown in FIG. 3. In the system of FIG. 1, ash is discharged each shift in a batch process from hoppers 14 through a bottom gate 16 on the side of the hoppers 14. Grinders 18 are provided to reduce ash particle size to less than 2 inches (typically) to allow conveyance in a pipe as an ash/water slurry. The slurry is discharged into a storage pond 20 where the ash settles out over time. Numerous pumps 22 and valves 24 are provided for moving the slurry through system 10. A modified form of system 10 provides closed loop dewatering system referred to as "Hydrobin® Dewatering System" 26 as shown in FIG. 2.

In the system 26 shown in FIG. 2, bottom ash 11 is discharged from the hopper 14 into the grinder 18 and is then pumped to remotely located dewatering bins 28. There is provided a two-stage settling process which is necessary to clarify the water enough for recycling. Settled ash is drained of water through screens in the dewatering bins 28. Surge tank 30 and settling tank 32 handle the drained water and provide further clarification and separation of coal ash from the water. Clarified water is recycled back to convey the next batch of ash slurry. Dewatered ash slurry is hauled away from the plant site.

The submerged mechanical drag conveyor system 12 illustrated in FIG. 3 is typically applied to provide continuous ash removal. Ash from the submerged drag chain conveyor unit 34 is dewatered through an inclined section 36 and transported via a conveyor 44 and into a bottom ash silo 38 and is discharged into a truck to transport the material off-site. Mill reject hoppers 40 are provided to process such material which is directed onto chain conveyor inclined section 36 for processing along with the bottom ash slurry stream. The submerged drag chain conveyor unit 34 is positioned directly beneath the boiler ash hopper discharge 42. Another view of submerged drag chain conveyor unit 12 is shown in FIG. 4 which further illustrates the conveyor drive unit 46 and take-up unit 48 which provides proper conveyor chain tensioning. In this prior art system, one of the units 12 shown in FIGS. 3 and 4 is provided for each boiler ash hopper discharge 42. In the unit of FIG. 4 the dewatered ash is directly discharge into a truck for off-site transfer.

SUMMARY OF THE INVENTION

This invention provides an alternative for dewatering ash slurry in which the slurry discharged from a number of individual bottom hoppers is transported to a remotely located remote submerged chain conveyor (RSCC) system. This system can be placed at a convenient location displaced from the boiler and provides many of the same functions as the basic submerged mechanical drag conveyor system 12 shown in FIGS. 3 and 4. This invention will be referred to as the remote submerged chain conveyor system or RSCC.

For the RSCC described in accordance with the present invention, a section of the conveyor system acts as a settlement tank much in the manner of the settling tank 32 in a Hydrobin® system 26 described above except that the settling tank is elongated. Accordingly, the RSCC system can be considered in many respects as a hybrid of features of submerged chain conveyor system 12 and Hydrobin system 26.

The RSCC system includes drag chain that moves the solids against the general flow of water through the system. In a further development, the RSCC system includes

BRIEF DESCRIPTION OF THE DRAWINGS

FIG. 10 illustrates basic components of the ash holding and ash settling sections of an RSCC in accordance with this invention.

FIG. 11 graphically illustrates tank flow patterns in an ash settling section without features to provide more uniform flow velocities across the water flow cross-section of the ash settling section.

FIGS. 12A and 12B illustrate simplified cross-sectional views through an ash holding section and an ash settling section in accordance with a first embodiment of the present invention.

FIG. 14 illustrates dimensional relationships for an ash settling section in accordance with a first embodiment of the present invention.

FIGS. 15A and 15B illustrate features of a containment plate.

DETAILED DESCRIPTION OF THE DRAWINGS

The RSCC system 50 in accordance with a first aspect of this invention is a dewatering device located remotely from the boiler (or multiple boilers) which utilizes a submerged drag chain conveyor for removal and dewatering of settled material. The system is a combination of a dewatering bin and a settling tank and is capable of dewatering the ash solids to an acceptable moisture level and at the same time able to clarify the re-circulated water to a desired concentration (mg/L or PPM). In accordance with this invention, bottom ash 11 is discharged from the boiler ash hopper 14 each shift into grinder 18 and is then pumped to remotely located RSCC 50. All the clarification of the slurry (dewatering) is done in a single stage and the water is recycled.

Figure 1:
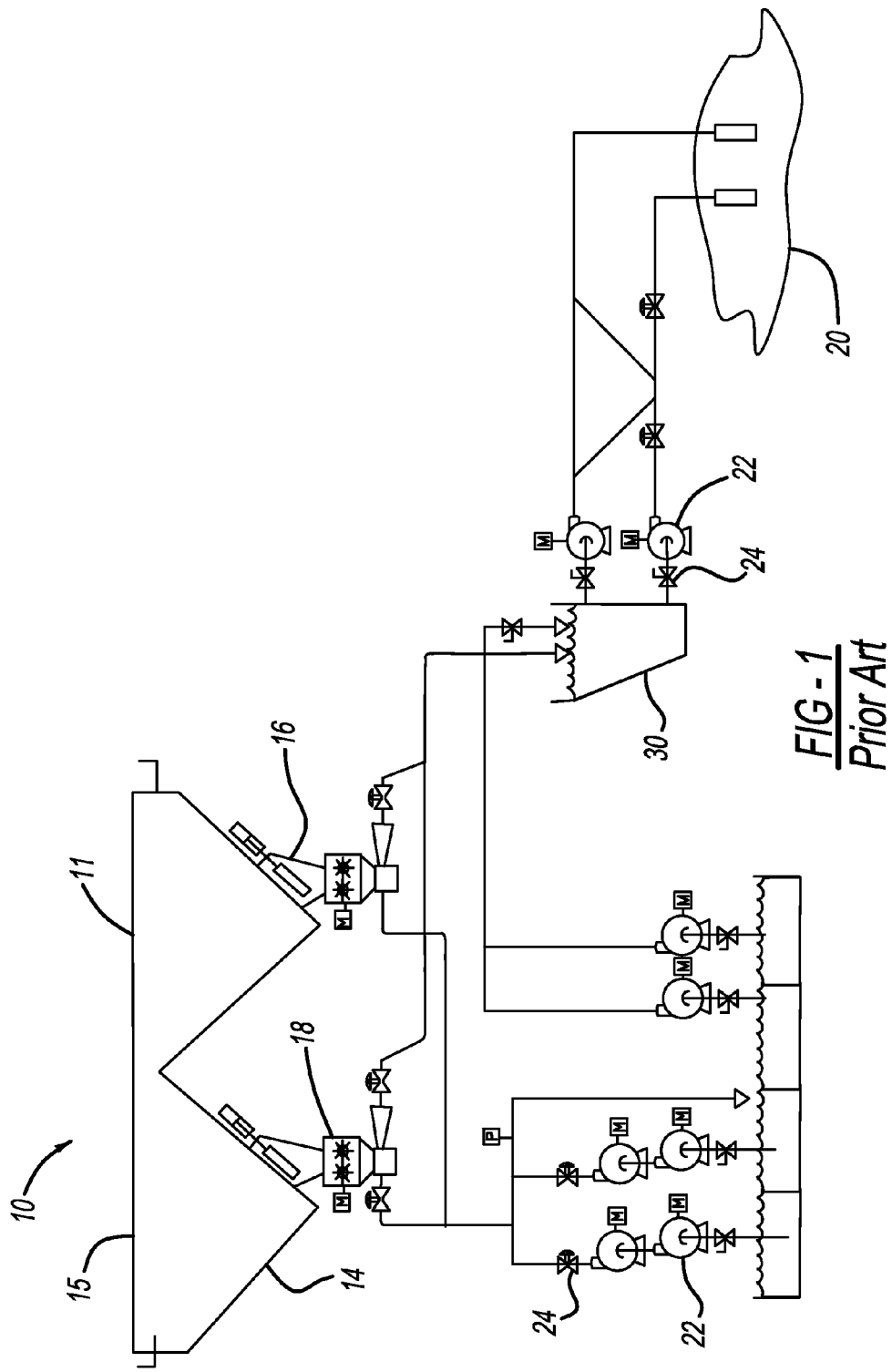
FIG. 1 illustrates a typical bottom ash to pond ash handling system in accordance with the prior art.
Figure 2:
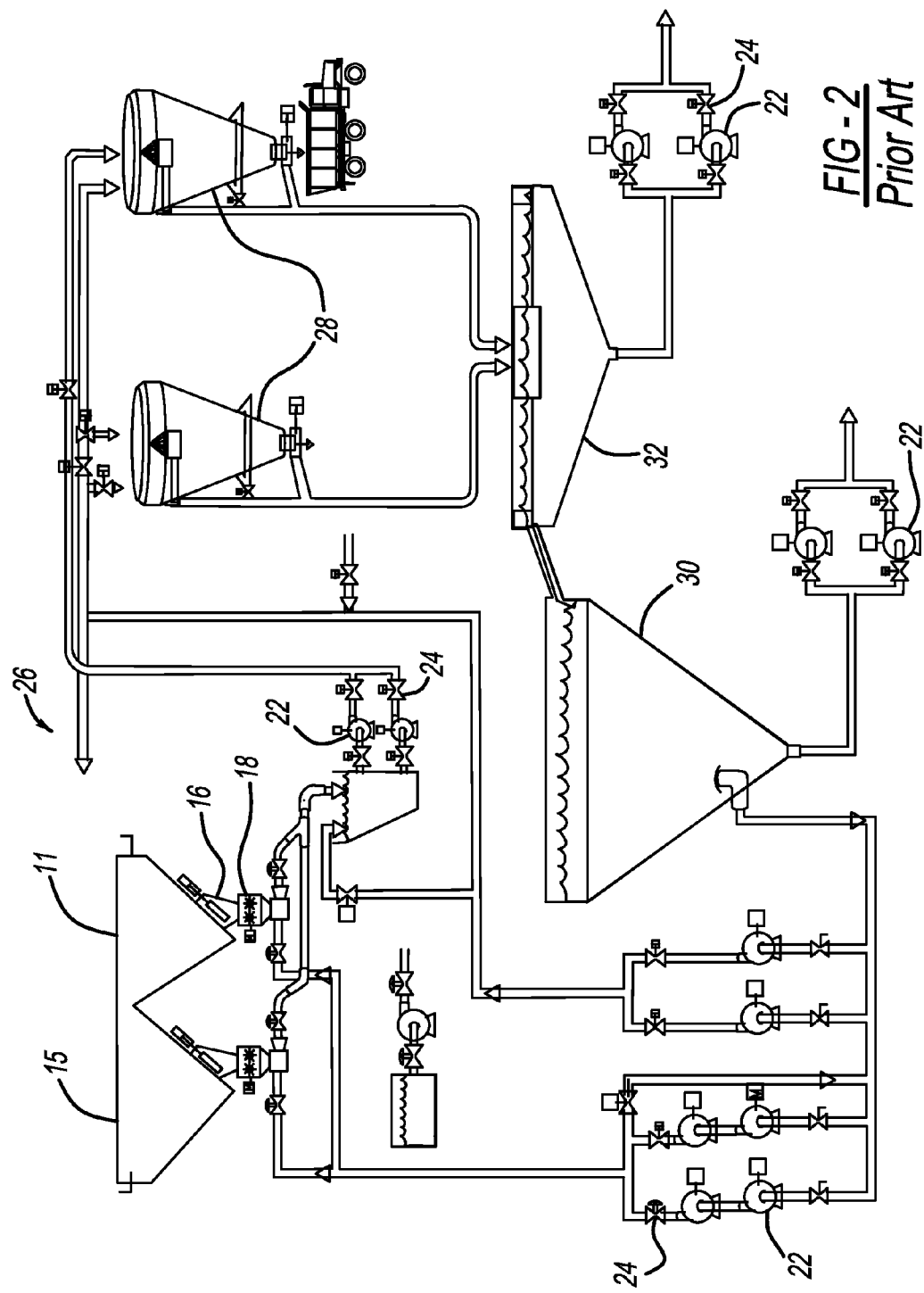
FIG. 2 illustrates a typical closed loop recirculation system for ash slurry handling in accordance with the prior art.
Figure 3:
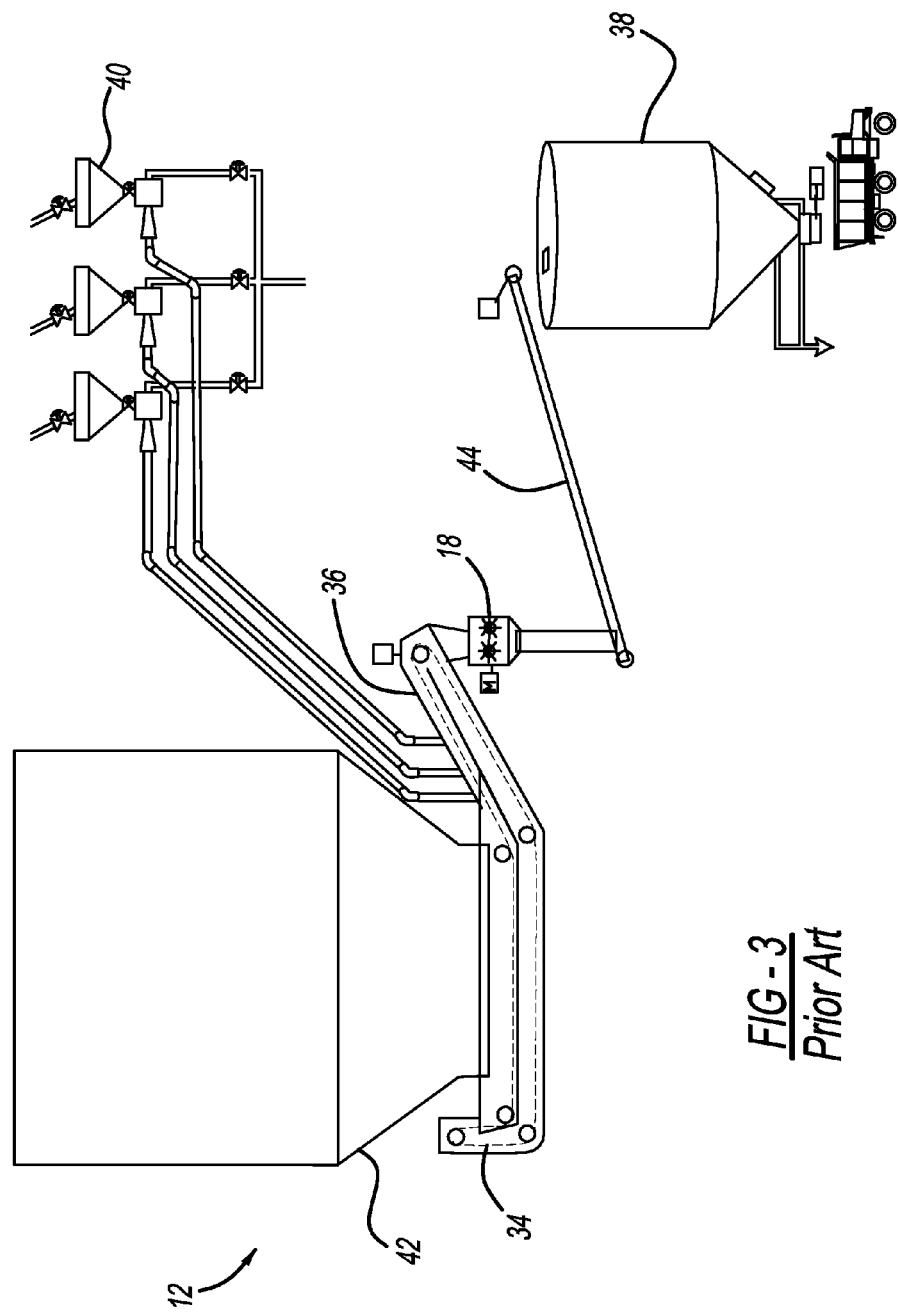
FIGS. 3 and 4 illustrate a typical bottom ash submerged drag chain conveyor system in accordance with the prior art.
Figure 4:
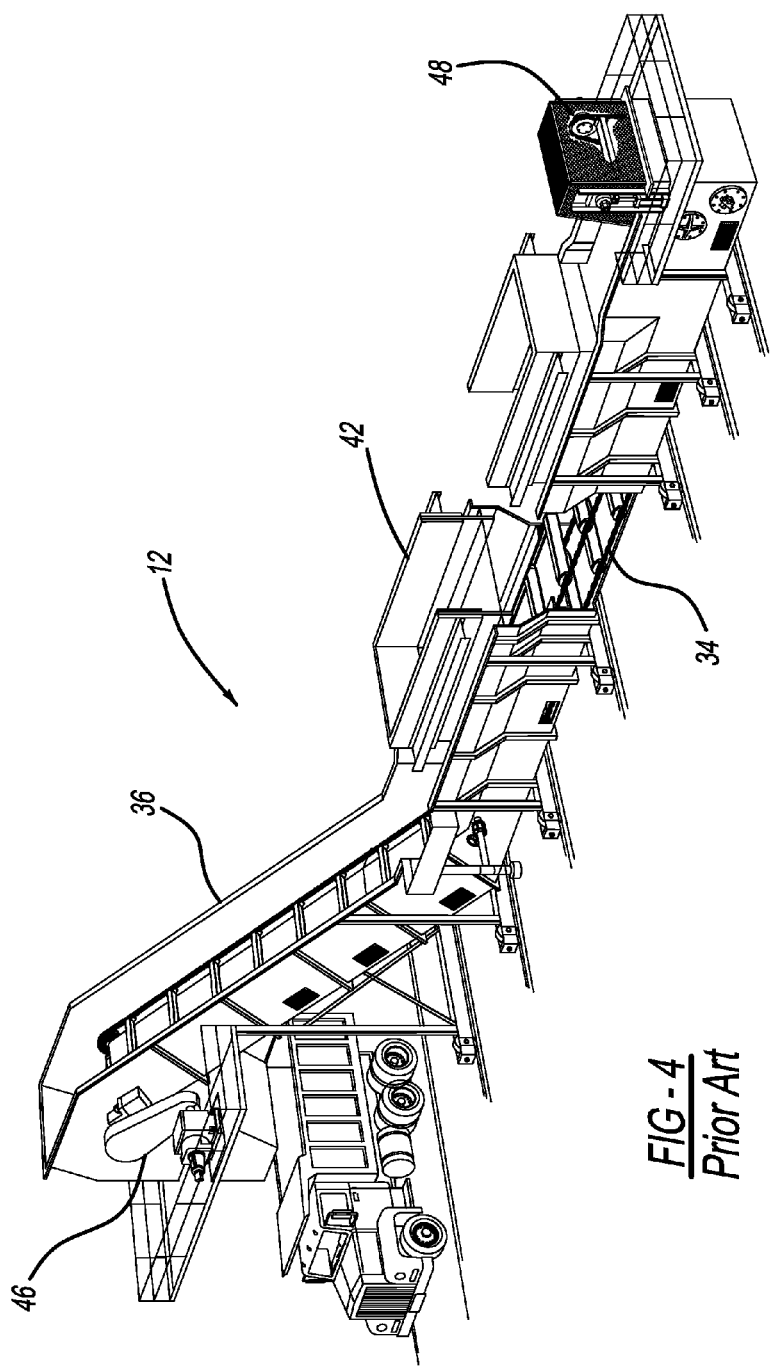
Figure 5:
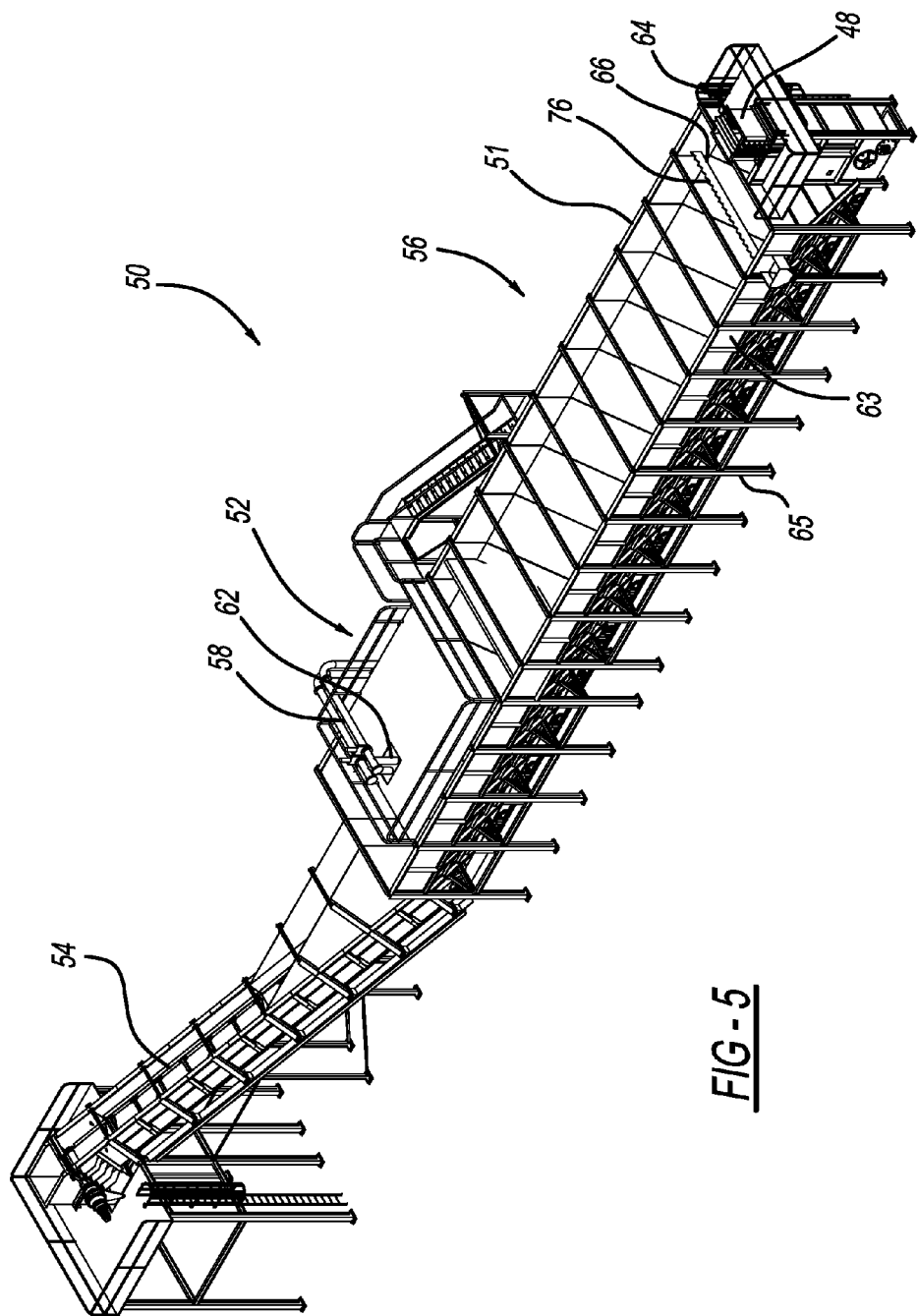
FIG. 5 illustrates a remote submerged chain conveyor (RSCC) system in accordance with the present invention.
Figure 6:
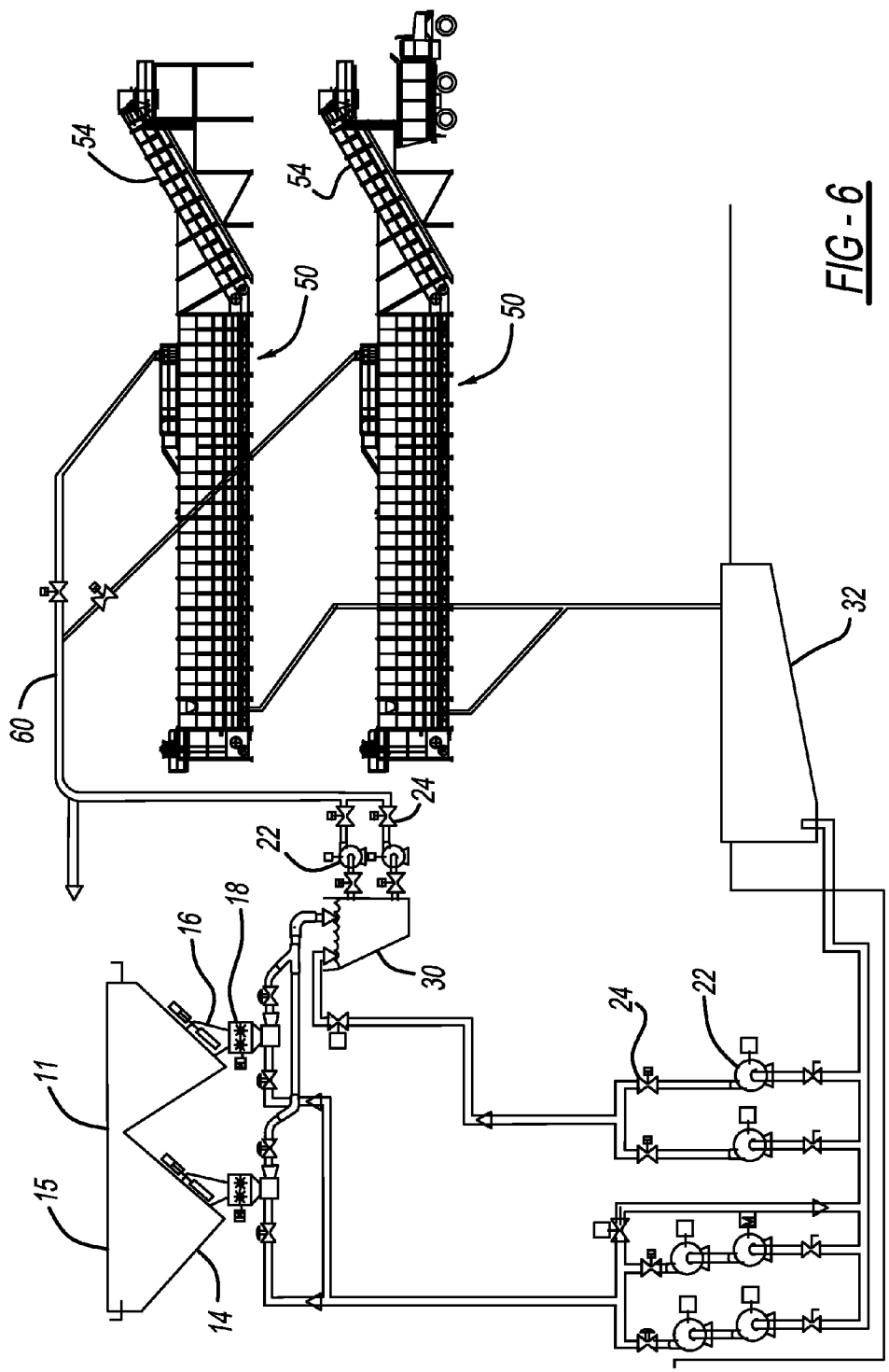
FIG. 6 illustrates schematically use of multiple RSCC systems in accordance with this invention.

An RSCC system 50 is shown in FIGS. 5 through 6, and consists of a large elongated containment tank 51 having three main sections including ash holding section (or storage section) 52, dewatering section 54, and ash settling section (or settling area) 56. These sections are described in further detail as follows.

The RSCC ash holding section 52 is the entry zone for the incoming coal ash/water slurry and it is located near the solid discharge end of the slurry discharge pipes 58. The solid inflow rate from pipes 58 may be two to three times larger than the solid removal rate from RSCC 50. Therefore, the ash holding section 52 is ideally sized to hold an entire boiler load. Ash holding section 52 contains the bulk of the accumulated volume of ash that is large enough to settle quickly (which may be greater than 90% of the total solids mass). The incoming slurry discharges onto a deflector plate 62 for dispersion rather than directly into the water in the ash holding section 52 in order to deaden jet impingement on the conveyor equipment.

In one embodiment of the present invention, the ash holding section 52 is sized to accommodate the influx of material from different boiler units 15. As shown in FIG. 6, a pair of RSCC units 50 could be provided for a single boiler unit 15, or number of boiler units 15 could be serviced by a smaller, equal, or greater number of RSCC units 50. The flow of ash slurry can be conveyed through associated plumbing systems with valves 24 and pumps 22 for managing the ash load based upon the ash settling capacity provided by the RSCC units 50. For coal bottom ash process, the ash holding section 52 is used for solid storage during the emptying of boiler bottom hoppers 14. Transport pipes 60 from different boilers 15 can discharge independently into the ash holding section 52 to eliminate the need for additional hardware such as valves and actuators. The capacity of the ash holding section 52 is dictated by the volume needed to meet the solid conveyance rate or customer storage requirements.

The dewatering section 54 shown in FIG. 5 is the inclined portion of the drag chain 64 where the ash solids are dewatered prior to unloading. The speed of the submerged drag chain 64 and the length of inclined section 54 determines the dewatering time which is very dependent on the ash characteristics. The majority of the moisture will be lost in the first few minutes after the ash is extracted from the water. The remaining small fraction is lost in several hours. Therefore, there is an optimum length for the dewatering section 54 where beyond which there is a diminishing return in terms of dewatering the ash. The dewatering section 54 length is dictated by the solid porosity and their ability to hold water. In general, solids lose a majority of their moisture in two to three minutes after removal from the water bath. Dewatering length and chain speed are designed to provide the necessary dewatering time. A dewatering section 54 inclination angle ranging between 25° and 35° from horizontal is considered optimum for certain embodiments of the present invention.

The settling section 56 is a principal feature of the RSCC system 50 in accordance with this invention. In this section, the effluent is clarified to a desired low concentration of solids. Solid separation is primarily accomplished by gravity settling. The key metric for determining this zone's dimension is the particle settling velocity which is a function of particle size, particle density, and water temperature. A further discussion of the theory of design of ash settling section 56 along with several embodiments of that section are provided following a general discussion of additional mechanical features of RSCC 50.

Beside the hydraulic aspect of the RSCC 50 which will be described in the following sections in detail, numerous mechanical components of the above referenced sections play an import role in the design of the RSCC system. The mechanical components include; drag chain 64, drive unit 46, and chain take up mechanism 48. A variable speed drive adjusted manually or/and remotely via a digital controller for driving drag chain 64 is preferably provided having forward and reverse chain motion capability, along with a system for monitoring drive unit torque to protect the chain.

Drag chain 64 is a standard product with matching sprockets and has two side chains with paddle shaped flights extending between them for moving accumulated particulates. Drive unit 46 may be a commercial hydraulic system. Chain stretching is compensated for by the take up mechanism 48 which may include a hydraulic cylinder. The chain loading is continuously monitored to protect the drag chain 64 in the event of an overload. Preferably take up mechanism 48 is capable of independent adjustment of both sides of the drag chain 64.

A general background discussion of basic concepts of gravity density separation of solid/liquid mixtures is useful to explain operation of ash settling section 56. The ash settling section 56 surface area (As), i.e. width (W) times length (L), is selected such that the particle settling velocity (Vs) is greater than the ratio of the volumetric flow (Q) and the surface area (i.e. Vs>Q/As). This condition is graphically illustrated in FIGS. 7 and 8, and is based on idealized rectangular tank settling theory. In this condition, a particle starting at the settling section inlet (proximal end 72) and beginning at the liquid surface would be retained long enough to reach the tank bottom at the distal end (i.e. where the liquid is discharged). The metric for sizing the settling zone is based on discrete particle settling approach, meaning that motion of an individual solids particle is considered and assumes no particle-to-particle interaction. Knowing the particle size distribution, particle density, flow area, and surface area, one can predict the outlet concentration as a function of tank surface area. The relationship between outlet concentration and tank surface area for discrete particle settling can be developed for a given ash sample. Generally, the larger the tank surface area (As), the lower the discharged effluent particle concentration in parts per million (PPM). However, there is a diminishing return where a larger tank area provides marginal reduction in PPM.

Figure 7:
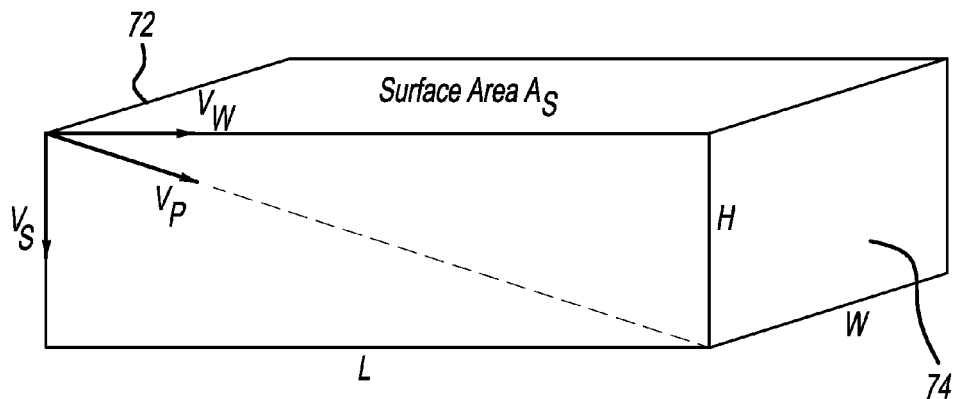
FIG. 7 is a diagram in connection with a description of rectangular tank settling theory.

With continued reference to FIG. 7 where tank dimensions L, W, H are designated along with particle settlement velocity vectors Vs, Vw, and Vp, the following relationships are developed for particle settlement modeling, based on idealized conditions, which assumes that the flow of the water is horizontal and uniform. A particle is predicted to settle and the removed when the settling time is less than or equal to the water detention time:

Settling Time=$H/V_s$

Water Detention Time=$H*W*L/Q$ $H/V_s \leq H*W*L/Q$ and

Simplifying: $Q/A_s \leq V_s$

Figure 8:
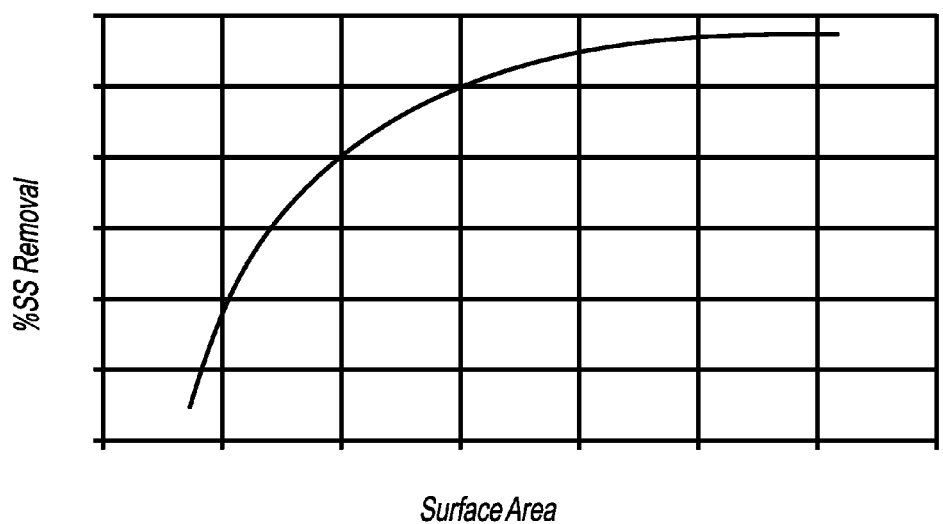
FIG. 8 is a graph of idealized settling efficiency as a function of surface area and solids removal.

Again based on idealized conditions, FIG. 8 illustrates settling efficiency as related to percent solids removal and surface area of the settlement zone. The relationship characterized previously indicates that settling efficiency increases with surface area As of the settlement zone.

In practice, particles in the settling zone (ash settling section 56) are not discrete and do integrate and interact with each other. This interaction allows small particles to coagulate and settle quicker. This phenomenon is referred to as natural coagulation and is influenced by particle concentration and other characteristics. This approach yields a smaller tank size capable of meeting PPM requirements compared to the discrete particle approach discussed previously.

The depth (or height designated as H) of the ash settling section 56 is less critical than the surface area, yet there is an optimum for; 1) providing adequate retention time for natural coagulation, 2) providing stable water flow, and 3) avoiding scour of material settled on the drag chain 64. The length of ash settling section 56 is mainly governed by the particle settling velocity, slurry flow, and tank width. The settling velocity Vs is dependent on particle size, particle density, and fluid temperature. Such parameters are typically defined by the application. The tank width (W) is selected for ease of manufacturability and transportation of prefab pieces.

Figure 9A:
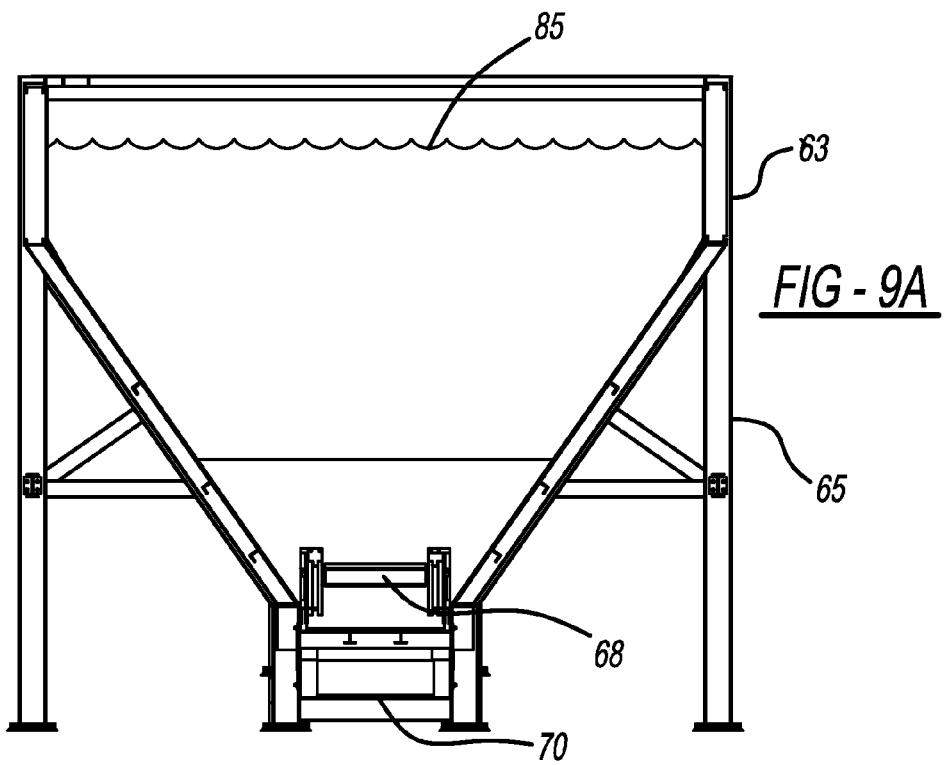
FIGS. 9A and 9B are cross-sections through an ash settling section accordance with the present invention.
Figure 9B:
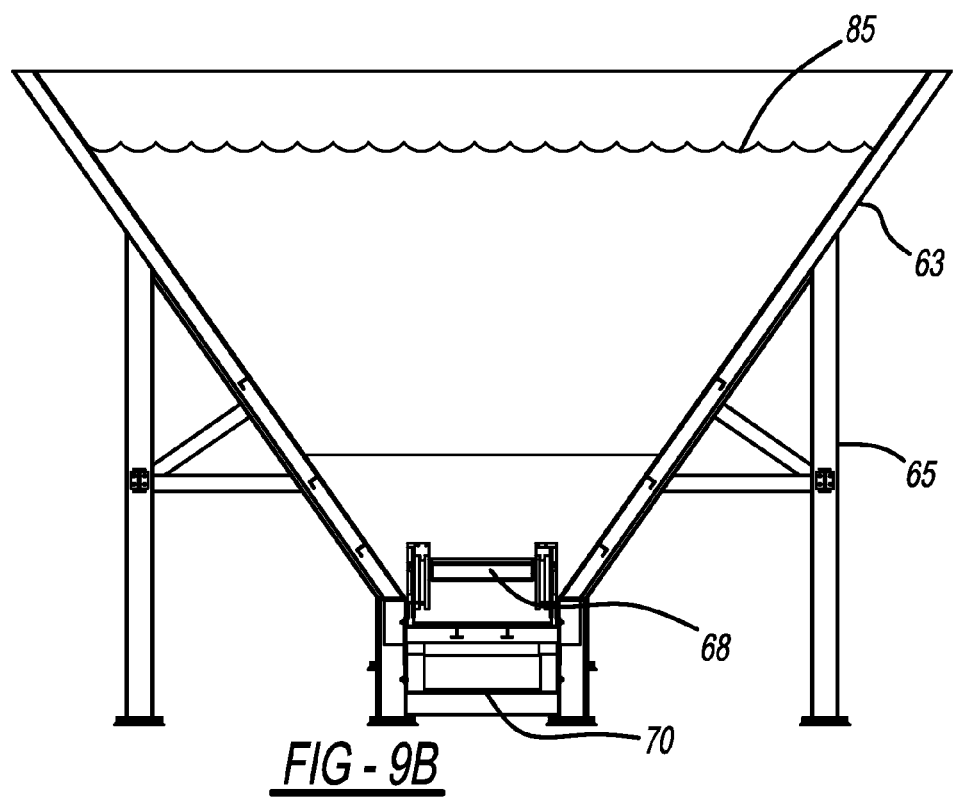

FIGS. 9A and 9B illustrate cross-sections through embodiments of ash settling section 56, showing that the configuration of side walls 63. FIG. 9A represents a settling section 56 having sidewalls forming a generally hexagon shaped water cross-section, whereas FIG. 9B illustrates an embodiment in which the settling section sidewalls form a generally quadrilateral shaped water cross-section. Shown at the bottom section of each of the embodiments is endless drag chain 64 having an upper path 68 for moving solids and a lower return path 70. Legs 65 provide structural support for RSCC ash holding and settling sections 52 and 56.

Referring to FIG. 10, a generalized longitudinal cross-section of ash holding section 52 and ash settling section 56 is provided. Water and slurry flow from ash settling section proximal end 72 to distal end 74. The drain trough 66 can be either a single section extending across the tank width but preferably situated at least 2-3 feet away from distal end 74, or it can extend in the axial direction. The drain trough 74 is equipped with a serrated weir 76 along its upper perimeter to limit particle carry over into the drain. The drain trough 66 should be located near the rear of the tank to maximize settling time. However, it is not best to place the trough 74 at the extreme back wall of the distal end 74 because the density currents (described in more detail as follows) tend to ride up the back wall. There is an optimum placement, balancing settling time with back wall effects.

In ash settling section 56 in accordance with this invention the general flow of water and ash particles is in the right-hand direction as the section is shown in FIG. 10, i.e. from proximal end 72 toward distal end 74, whereas the upper path 68 of drag chain 64 moves in an opposite direction i.e. from right-to-left in the figure. Thus the portion of drag chain 64 that moves the solids causes the solids to move against the general flow of water through the system.

One single drain trough 66 may be placed across the width of the tank, or several sections may be used to meet the design criteria. The sections can be placed in parallel or perpendicular to the axial flow. Additional inventive features of ash settling section 56 are described later in this specification following a discussion of additional particle settling theory.

FIG. 11 illustrates tank flow patterns in the ash settling section 56 without internal features in accordance with this invention, and serves to aid in an understanding of the features of the present invention. In FIG. 11, darker regions designate areas of higher velocity. As shown, an elongated configuration ash settling section 56 without baffles or other features described later will have a strong current along the bottom of the tank (density current) resulting in a "short-circuiting" of the flow (i.e. a strong high velocity flow along the bottom). Density currents are the result of a concentrated stream of particles plunging to the bottom of the tank due to its high specific gravity. This occurs in the settling section 56 of the tank so it is largely made up of the smaller size fraction of the particle size range. Strong current continues along the bottom unimpeded toward the rear of the tank. When it approaches the end wall of distal end 74 at the discharge around it will turn upward, delivering a highly concentrated stream into the drain trough 66 which is, of course, undesirable. This high flow velocity is designated in FIG. 11 at the bottom of the tank and interferes with the desired particle separation activity.

Figure 13A:
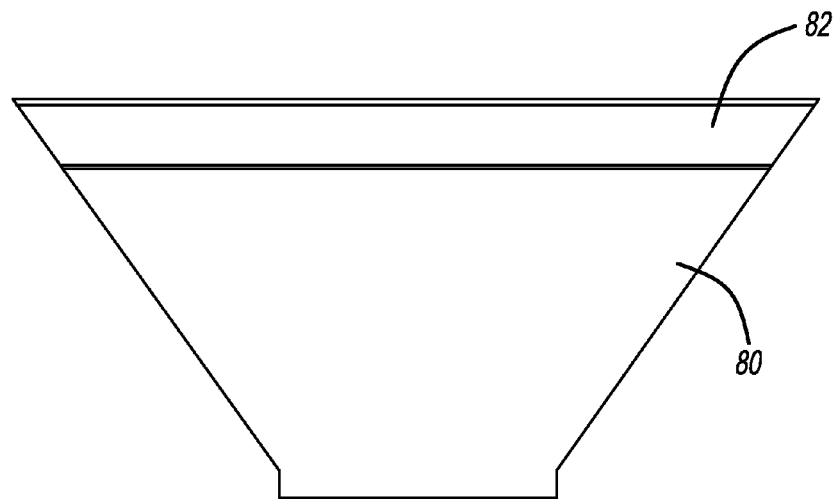
FIGS. 13A, 13B and 13C illustrate and embodiment of baffles used in the embodiment shown in FIGS. 12A and 12B.
Figure 13B:
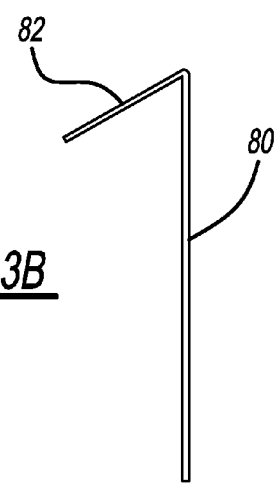
Figure 13C:
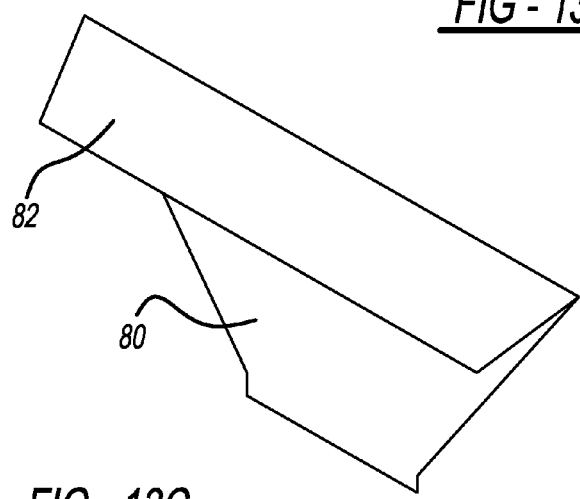

FIGS. 12A and 12B illustrate cross-sections of the ash holding section 52 and ash settling section 56 in accordance with a first embodiment of this invention. In accordance with this embodiment, baffles or shields 80 are provided in ash settling section 56 as indicated in the Figures. Baffles 80 (of a non-perforated variety) preferably extend less than one-half the height of the water column between drag chain 64 and liquid level 85 and extend across the entire width of the water flow path along ash settling section 56. Redistribution of flow to be uniform is ordinarily difficult with the density currents mentioned previously. In FIG. 12A, the predominant flow of material through the ash settling section 56 is represented by lines with direction arrows. The provision of the baffles 80 progressively weakens the density current as it travels toward overflow drain trough 66. Several short baffles 80 are placed along the bottom, forcing the current to travel in a roller coaster pattern as indicated by the arrows in FIG. 12A. Each time the current drops between baffles 80 it leaves a portion of solids behind (which can be removed by the drag chain 64). The progressively weakening current has a lesser tendency to dive down between the baffles 80 each pass. Preferably baffles 80 feature a bent over flap 82 shown in FIGS. 13A, 13B and 13C directed against the flow of material through ash settling section 56, further disrupting the transfer of solids between sections bounded by the baffles. It is noted that the conveyor drag chain 64 will move just below the bottom edge of the baffles 80 to remove the settled-out particles.

Through experimentation, relationships between the heights of the baffles 80 which may include baffles of a relatively short height (D1) along with one or more baffles of a relatively taller height (D2) can be developed as related to their separations, designated by dimensions L1, L2, L3 and L4, considered with the length (L) of the ash settling section 56. With these dimensional definitions in mind which are designated in FIG. 14, the following design relationships are believed to provide enhanced settling efficiency:

$$0.15L < L_1 < 0.25L$$

$$0.25L < L_2 < 0.35L$$

$$0.15L < L_3 < 0.25L$$

$$0.1L < L_4 < 0.15L$$

$$D > 10 \text{ ft}$$

$$0.3D < D_1 < 0.4D$$

$$0.4D < D_2 < 0.5D$$

At the junction between ash holding section 52 and ash settling section 56 containment plate 84 is provided. Containment plate 84 provides a hydraulic decoupling between the turbulent inlet section and the ash settling section 56. FIGS. 15A and 15B show a containment plate 84 used to prevent the bulk accumulated volume of large particles in the ash holding section 52 from spilling into the ash settling section 56 and disrupting the flow patterns. Containment plate 84 includes a number of deflected flaps 86 acting as a coarse filter for the flow.

Figure 16:
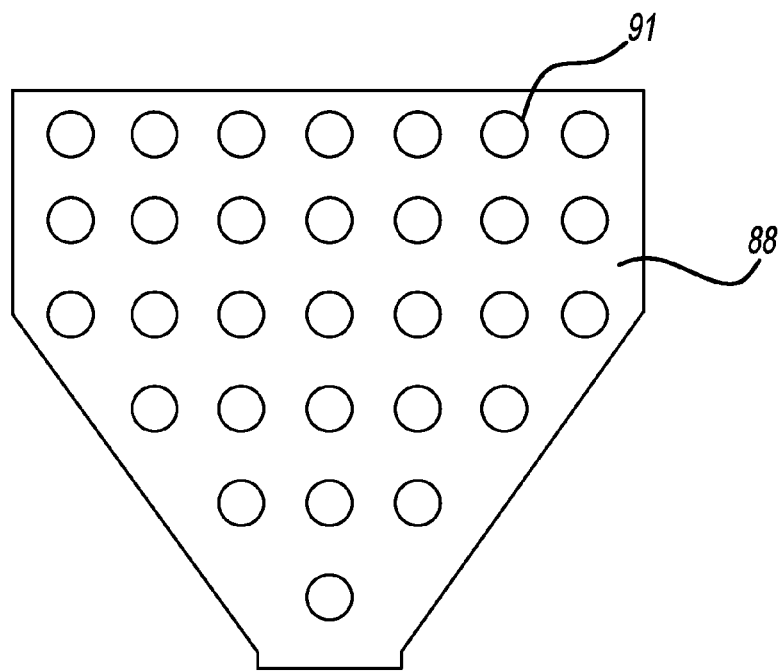
FIG. 16 illustrates an alternate embodiment of a baffle component.

FIG. 16 illustrates an alternate embodiment of a baffle 88 which may be used in ash settling section 56 as an alternative to the design of baffle 80 discussed previously. Baffle 88 features numerous apertures 91 shown as round holes in the figure. Baffle 88 is intended to extend upwardly the full height of the water column within ash settling section 56 (or substantially full height of the water column). Baffle 88 is intended to provide more uniform flow velocity of the ash slurry and water as it moves from proximal end 72 toward distal end 74. Baffle 88 breaks up the density currents previously discussed. Baffle 88 may be positioned at the locations previously described for baffle 80. Other configurations of a baffle may be used, for example having different shaped apertures or other features to disrupt concentrated high velocity flow, particularly along the lower region of the water column as the slurry moves toward distal and 74. For example, a baffle having a configuration similar to containment plate 84 may be employed.

Figure 17:
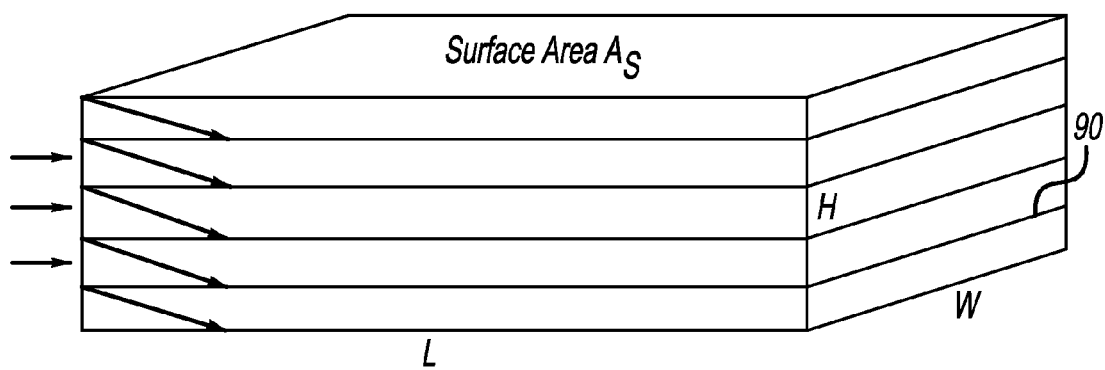
FIG. 17 illustrates conceptually use of stacked plates for particle settling.
Figure 18A:
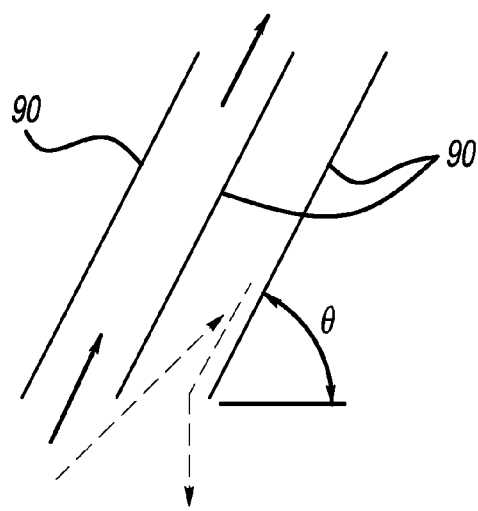
FIGS. 18A, 18B and 18C illustrate flow conditions when using stacked plates for particle settling.
Figure 18B:
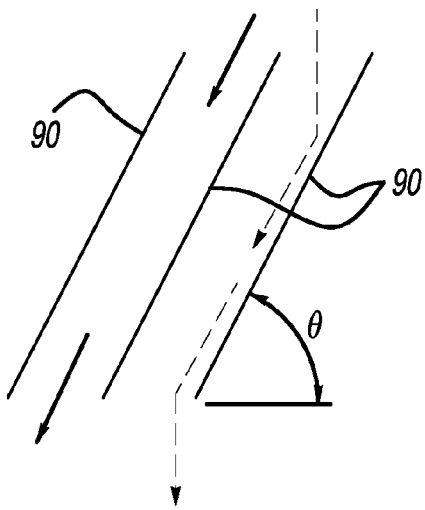
Figure 18C:
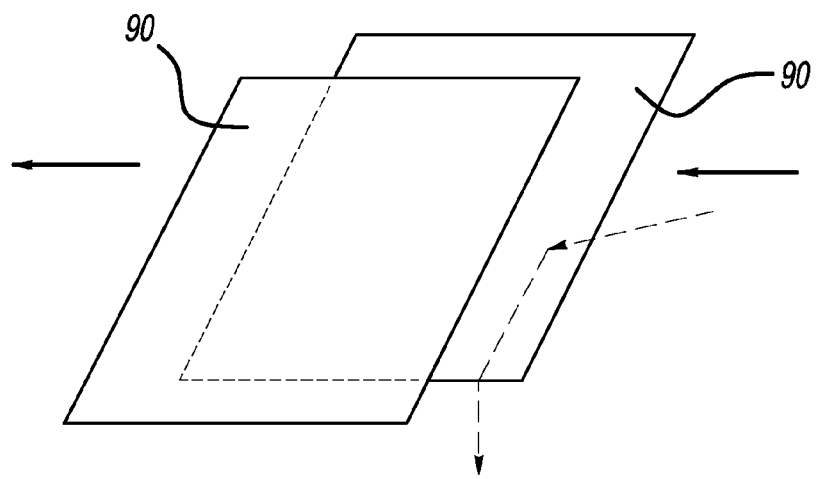

FIG. 17 illustrates conceptually an approach toward enhancing settling efficiency through the use of stacked plates 90 located in the ash settling zone 56. The use of stacked plates 90 can be combined with features of baffles 80 described previously to enhance separation efficiency. Stacked plates 90 provide a significant increase in the effective surface area provided in the settling zone. Multiple plates 90 can be stacked to increase this effect. These plates 90 increases the effective surface area available for settling but without requiring an increase in tank size. Various orientations of the plates can be provided as illustrated by FIGS. 18A, 18B and 18C. In these figures, liquid flow is shown by solid lines and the flow of solids is shown in broken lines. In one implementation referred to as a countercurrent flow arrangement shown in FIG. 18A, the plates may be positioned at an angle θ (skewed from horizontal) so that solids settling on the plates can shed off by gravity. In this configuration, liquid enters from a lower portion of the gap between adjacent plates and moves in a horizontal an upward direction along the plate surfaces. FIG. 18B illustrates a co-current flow condition in which the predominant liquid flow is horizontal and downward. FIG. 18C shows a cross-flow condition in which the predominant liquid flow is generally along the plates. At plate angles of less than about 60° from horizontal, there is theoretically little difference in these configurations. For applications with ash settling section 56, the cross-flow configuration illustrated in FIG. 18C is believed particularly applicable since this configuration does not divert the horizontal flow stream, which aids in reducing eddies and turbulent flow conditions thereby aiding in solid settling efficiency. By angling the plates as shown in the figures, collected solids can fall by gravity along the surfaces of the plates 90 where they can be collected and transported.

Figure 19:
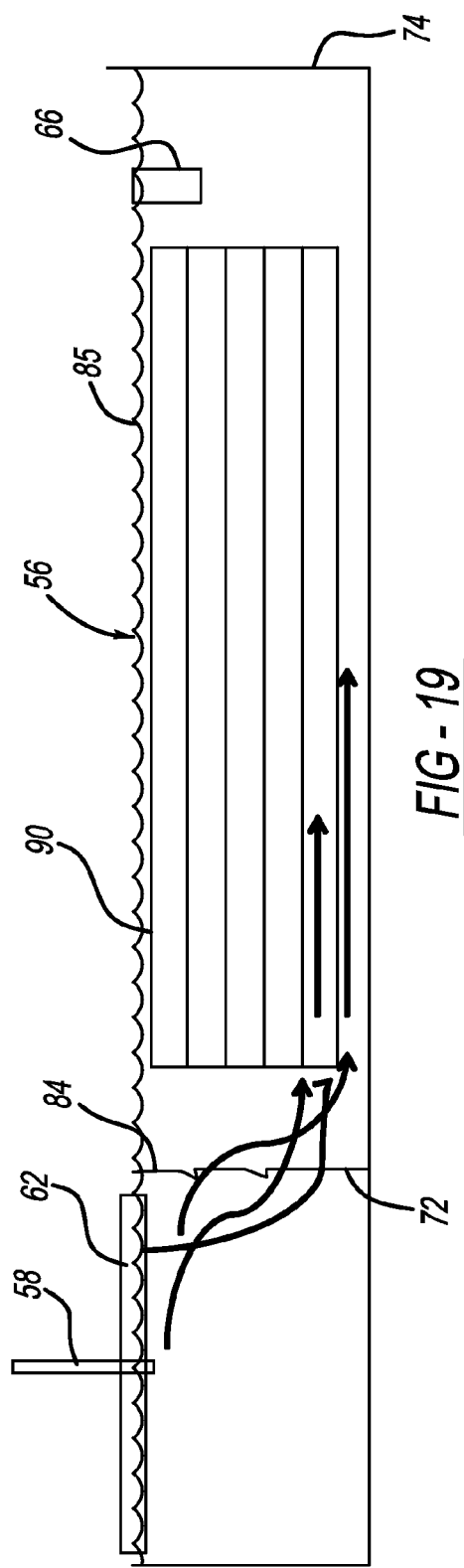
FIG. 19 is a cross-sectional view through an ash holding section and ash settling section in accordance with a second embodiment of the present invention employing a single array of stacked plates.

FIG. 19 illustrates a cross-section of ash holding section 52 and ash settling section 56 with the stacked plates 90 system. In this embodiment of the invention, stacked plates 90 are provided in a cross-flow configuration. It is noted that the conveyor chain will move just below the bottom edge of the baffles 80 as they are installed in the ash settling section. As shown by the flow arrows the higher velocity density current will tend to flow along the lower plates 90. FIG. 17 shows vector arrows illustrating the relative velocity of the ash/water mixture moving along the zones created by the stacked plates. Without further measures as described below, a higher flow velocity (density current) will occur in the lower channels defined by the stacked plates. More preferred is to provide generally equal velocity between all the zones defined by the stacked plates.

Figure 21:
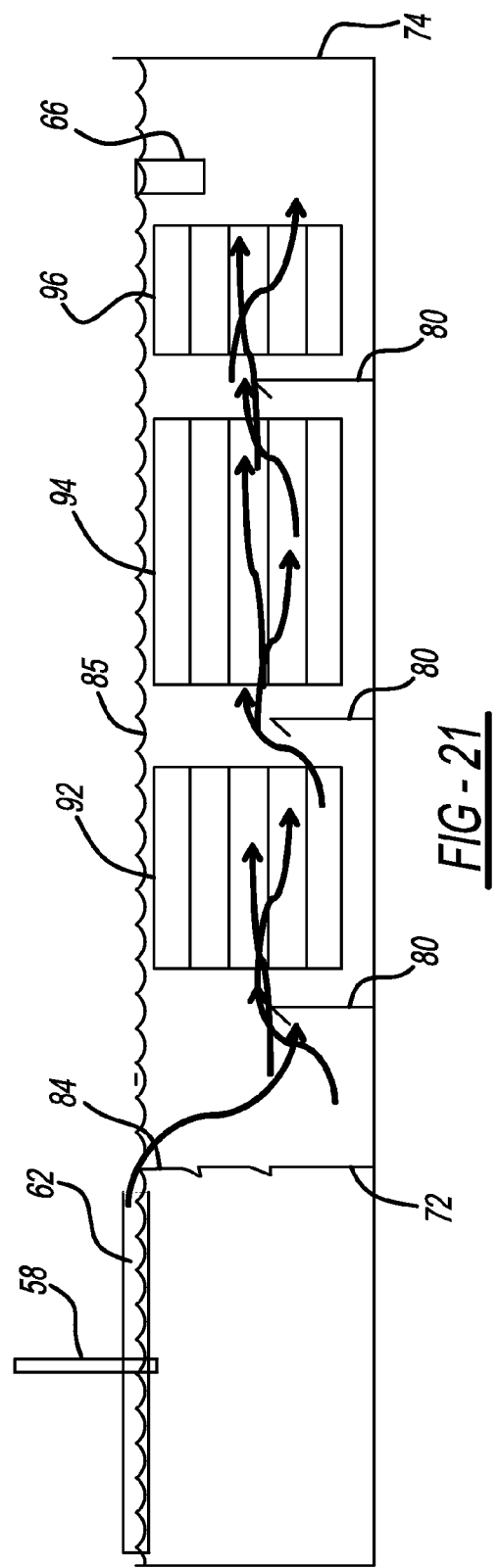
FIG. 21 is a cross-sectional view through an ash holding section and an ash settling section in accordance with a third embodiment of the present invention integrating features of baffles and groups of stacked plates.
Figure 20:
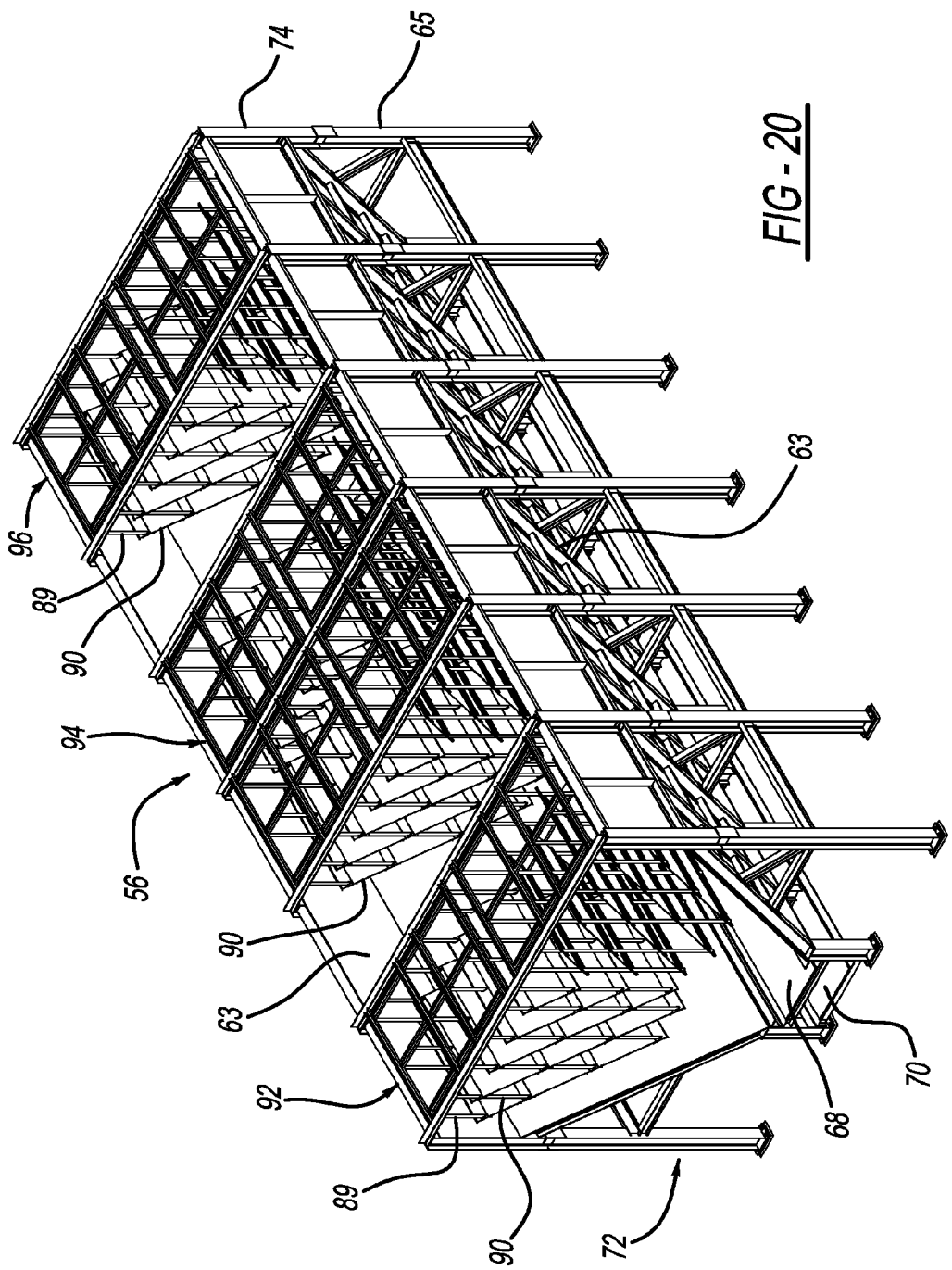
FIG. 20 is a pictorial view of the ash settling section shown in FIG. 19 with multiple arrays of stacked plates.

FIG. 20 illustrates an implementation of stacked plates 90. The plates 90 may be stacked in a pair of arrays which are symmetric about a vertical plane passing through the longitudinal center of the ash settling section 56. The pairs of arrays of stacked plates 90 are angled to the bottom of the V-shaped ash settling section walls 63, and preferably are oriented parallel to the surface of the side walls. As mentioned previously, the effective area created by plates 90 is equal to their projected horizontal surface area, whereas there inclined orientation promotes shedding of solids toward the center and bottom of ash settling section 56. This enables collected particles to flow along the plates by gravity and fall into the bottom zone where the submerged chain conveyor can remove them. Plates 90 may be hung from stringers 89 or by other means. In FIG. 20 another feature of the present invention is depicted; namely, that stacked plates 90 are provided in a series of the separate modular plate groups. In this embodiment, three separate stacked plate groups of stacked plates 92, 94, and 96 are provided with baffles 80 interposed between them as illustrated diagrammatically by FIG. 21 (not visible in FIG. 20). As discussed in connection with prior embodiments, baffles 80 prevent a strong bottom density current from occurring as illustrated in FIG. 17, and forces the flow pattern to distribute vertically along the channels defined by the stacked plate arrays 92, 94, and 96. Although three separated arrays of stacked plates 92, 94 96 are illustrated, a fewer number may be used along with one or more baffles. It is believed optimal that at least two stacked plate groups 92 and 94 are provided with at least one baffle 80 positioned between the stacked plate groups.

Figure 22:
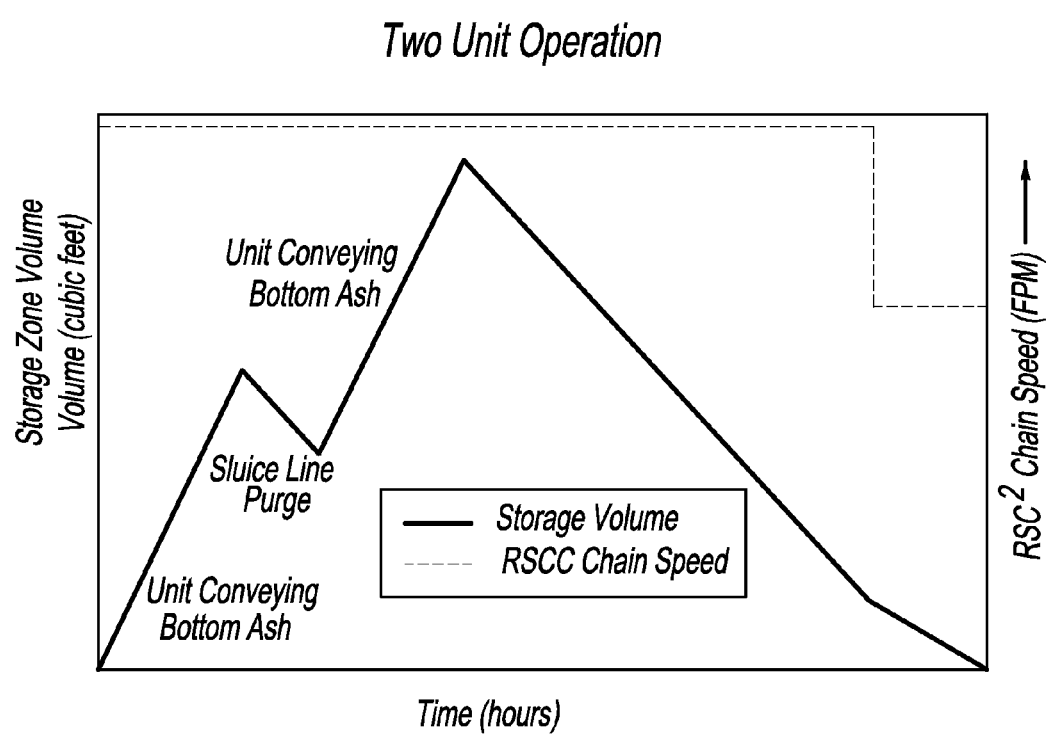
FIG. 22 is a graph representing operation of a single RSCC in accordance with this invention servicing two separate boiler units.

Now with reference to FIG. 22, design principles for a system including RSCC 50 are described. The Figure is related to a system having one RSCC 50 servicing two boiler units 15. For an implementation of this invention, ash holding section 52 is sized according to the ash conveyance rate defined by the ash production rate, the convey time and the conveyance frequency. Additional factors are the ash density and the speed of drag chain 64. Referring again to FIG. 22, as the first boiler unit 15 conveys bottom ash, the volume accumulates in the ash holding section 52 because the rate at which solids are entering the tank is greater than the rate at which they are being removed by the drag chain 64. When the first boiler unit 15 is finished (for example after 2 hrs.), a period of purging of the sluice lines (slurry discharge pipe 58) with water follows (for example for 30 minutes) and the drag chain 64 continues to run, evacuating some of the settled ash. When the second boiler unit 15 begins to convey bottom ash which results in a net accumulation of ash volume in the ash holding section 52 (again for example for 2 hrs.). The volume of accumulated ash when both boiler units 15 are finished conveying for that shift determines the required volume of ash holding section 52. At this point the remaining time in the cycle (for example about 7.5 hrs. for a 12 hr. cycle time) is used to evacuate all the solids in the ash holding section 52. Depending on the quantity of solids to be removed and the time until the first boiler unit 15 conveys again, the chain speed of drag chain 64 (shown by the dotted line in the figure) may be slowed during this time to minimize agitation in the ash settling section 56.

In addition to the features mentioned previously, a RSCC 50 in accordance with this invention may also incorporate the following features and applications:
1. The RSCC 50 is a dewatering device that functions as a thickener for dewatering solids and as a clarifier for purifying the process water.
2. The RSCC device 50 can be used for solid dewatering and water purification for any type of solid/liquid slurry, including but not limited to coal bottom ash.
3. The RSCC 50 can be placed at any physical location in a process involving water recycling.
4. For power plants application, the RSCC 50 is preferably placed at a location distant from the boiler 15 to preserve space for other processes.
5. For low flow applications, e.g. <100 gpm, the RSCC 50 may be a mobile unit that can be transported to multiple sites.
6. The RSCC 50 can handle slurry with wide range of flow ($10,000>X>50$ gpm), solids concentration ($10\%>x>0.01\%$), and particle size distribution (2 in.$>X>1$ micron).
7. The RSCC 50 cross sectional shape through ash settling section 56 may be constant across the length of the ash settling zone or varied. Requirements for the ash holding section 52 may be such that a large volume is need for accommodating relatively large load. The ash settling section 56 may not require such a large area to settle the fines, or vice versa.

Figure 23:
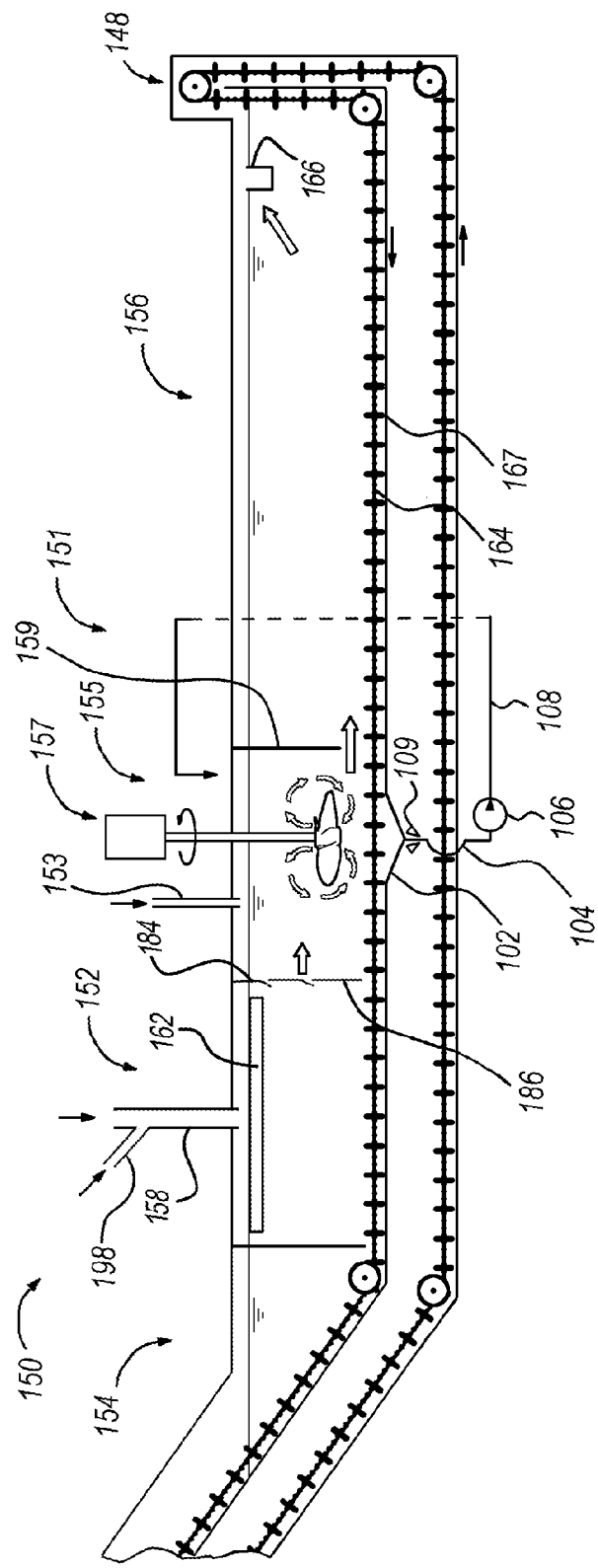
FIG. 23 is a cross-sectional view through a further embodiment of an RSCC system including an ash holding section, a mixing section for the addition of a flocculant, and an ash settling section.

FIG. 23 of the drawings illustrates an RSCC 150 according to a further aspect of the present invention. Similar to the RSCC 50 of FIG. 5, the system of FIG. 23 is a combination of a dewatering bin and a settling tank and is capable of dewatering the ash solids to an acceptable moisture level and at the same time able to clarify the re-circulated water to a desired concentration (mg/L or PPM). All the clarification of the slurry (dewatering) is done in a single stage, and the water is recycled. Elements corresponding to those of FIG. 5 bear reference numerals raised by 100 with respect to those in FIG. 5.

The RSCC 150 of FIG. 23 consists of a large elongated containment tank 151 having four main sections including ash holding section 152, dewatering section 154, mixing section 155 (which does not have an analog with prior embodiments), and ash settling section 156. Previous embodiments of RSCC described herein utilize principles of density/gravity separation. A primary objective using this principle is to provide a low level of fluid flow and a high residence time of particles which allow them to settle out of the liquid by gravity. The prior embodiments described approaches toward maximizing this effect. RSCC 150 uses those principles along with the use of a coagulant and/or flocculant which is a material or chemical additive which enhances aggregation of particles within the slurry. In order for this approach to be successful and intentional mixing and turbulence of the slurry is desired. In this embodiment such mixing occurs in mixing section 155. After introducing the flocculant in mixing section 155 and optionally a coagulant preceding the flocculant injection, the slurry thereafter flows to settling section 156 which again employs the principles of separation described in connection with the prior embodiments.

The ash holding section 152 of the RSCC 150 is the entry zone for the incoming coal ash/water slurry and it is located underneath a solid discharge end of slurry discharge pipes 158. The ash holding section 152 corresponds in its function to the ash holding sections of FIGS. 5 and 6. The incoming slurry discharges onto a deflector plate 162 for dispersion rather than directly into the water in the ash holding section 152 in order to deaden jet impingement on the conveyor equipment. Optionally, a coagulant supply line 198 is connected to the slurry discharge stream, for example, in the slurry discharge pipes 158 for the addition of a coagulant to the slurry before the slurry reaches the tank 151. Generally, various locations in the slurry path shown in FIG. 6 prior to entering the RSCC tank may be suitable for the addition of the coagulant. An early addition may aide the uniform distribution of the coagulant within the slurry-coagulant mixture as the slurry-coagulant mixture is moved through containers and pipes. For example, the coagulant may be added at any stage between grinders 18 and the ash holding section 152. Alternatively, the coagulant may be added in the ash holding section 152 itself.

The dewatering section 154 shown in FIG. 23 operates in analogy of the dewatering section of FIG. 5 and is dimensioned based on the same considerations. The drag chain 164, drive unit (not shown), and chain-take-up mechanism 148 are similar to those described in connection with FIG. 5. As previously described, the drag chain 164 has two side chains with paddle shaped flights 167 extending between them for moving accumulated particulates.

The RSCC 150 of FIG. 23 is equipped with a mixing section 155 between the ash holding section 152 and the ash settling section 156 to incorporate solids recirculation in the RSCC 150 to achieve a flocculation effect. The RSCC 150 is thus divided into four zones for the purpose of managing solids. The raw feed slurry, which optionally includes the coagulant, enters the ash holding section 152 at an upstream end of the RSCC tank 151, where approximately 80%-90% of the solids settle readily due to their large size. In most applications, the ash holding section 152 is designed to accommodate an accumulation of solids. The overflow trough 166 is located at the downstream end of the RSCC tank 151, which results in net water flow direction from left to right in FIG. 23, while the submerged traveling chain-and-flight assembly moves in the opposite direction toward the dewatering section 154.

A containment plate 184 separates the ash holding section 152 from the mixing section 155. The containment plate 184 is designed to prevent the piled solids from spreading into the mixing section 155 while still permitting water and fine particles to pass through along the vertical plane of the plate. The containment plate 184 includes a plurality of deflected flaps 186 forming perforations acting as a coarse filter for the flow and may be structured in a similar or identical manner as the containment plate shown in FIGS. 15A and 15B.

A flocculant is injected into the mixing section 155 via a flocculant supply line 153, where an agitator mixes the flocculant into the slurry that has passed from the ash holding section 152 into the mixing section 155. Flocculant injection may be preceded by coagulant injection spatially and temporally to enhance the efficiency of flocculation. This may be accomplished in the slurry discharge pipe 158 via the coagulant supply line 198 or in the ash holding section 152. In the shown example, the agitator is formed by a motor-driven impeller 157. The impeller 157 may produce a core up-flow and annular down-flow as designated by arrows or a core down-flow and annular up-flow at a recirculation rate corresponding to three- to five-fold the flow rate of the incoming raw slurry. Suitable flocculants include polymers, such as polyelectrolytes, that may be used as a single additive or in conjunction with other polyelectrolytes. The flocculant may be added simultaneously with or subsequent to the coagulant that may consist of electrolytic salts. By measuring the added slurry volume in the slurry discharge pipe 158 over time (not shown), the flocculant supply may be dosed accordingly for optimized results.

The flocculant causes an agglomeration of solids as generally known from wastewater treatments. The water and the flocculated solids of the mixing section 155 enter the ash settling section 156 by passing underneath, over, or through a plate-shaped barrier 159. The barrier 159 thus reduces the cross-section of a flow of water and solids from the mixing section 155 to the ash settling section 156. In the shown example, the barrier extends from the top of the tank 151 over approximately 15% to 80% of the depth of the tank 151 and blocks a passage in the upper portion of the tank 151. The barrier 159 allows the chain-and-flight assembly 164 to pass through under its bottom edge.

The ash settling section 156 is sized to provide the necessary time for the flocculated solids to settle out of suspension before the water reaches the overflow weir or trough 166. Baffles or inclined plates as shown in FIGS. 12 through 21 may be included in the ash settling section 156 to condition flow patterns for additional mixing and/or to enhance settling.

To obtain a greater degree of bottom ash sluice water clarification, it is beneficial to create the largest flocs possible to maximize the settling rate and therefore minimize the size of tanks of ash settling section 156 used for clarification. The creation of large flocs requires the agglomeration of many particles. It is thus desirable to place a higher solids concentration in the mixing section 155. The increased solids concentration will result in better flocculation due to the availability of more contacting particles, thus yielding larger flocs. This has been confirmed in both experimental studies and practice. Typical optimum solids concentrations are 5%-15% by weight, depending on the particle sizes. Smaller particle sizes will have lower optimum concentrations. Typical fine solids content in bottom ash slurries is less than 2% by weight. This suggests that flocculation efficiency can be increased by recirculating solids in mixing section 155 to increase the solids concentration.

From the ash settling section 156, settled solids are carried by the flights 167 that are moved by the drag chain 164 back into the mixing section 155 where they are deposited into an internal collection hopper 102. The internal collection hopper 102 is narrower than the width of the flights 167 such that the flights 167 will straddle the opening in the floor and will not lose complete contact with the floor of the tank 151 to prevent jamming. The internal collection hopper 102 is dimensioned to accommodate approximately the volume of material carried by each flight 167. A pump suction line 104 is connected to the bottom of the internal collection hopper 102, where an external pump 106 returns the solids to the top of the mixing section 155 via a return path 108. The pumping capacity is preferably dimensioned to meet or exceed the flow of material from the flights 167 into the internal collection hopper 102.

Once the desired flocculation has been achieved and the solids can be removed from the RSCC 150, the pump 106 can be shut off to allow the internal collection hopper 102 to fill. When the internal collection hopper 102 is full, it receives no additional solids. At this point, all solids moved by the flights 167 are carried up the conveyor incline of the dewatering section 154 and removed from the unit.

The suction line 104 of the pump 106 between the collection hopper 102 and the pump 106 may include flushing nozzles 109 for eliminating clogging at a restart of the pump 106 to remove solids that may have consolidated while the pump 106 was not in operation. The nozzles 109 are only shown schematically in FIG. 23. For simplicity, any conduits supplying the nozzles 109 with water are omitted.

Solids flocculation involves the agglomeration of smaller particles into larger flocs to increase settling rate. There are various mechanisms in which this may happen. Bridging flocculation can be achieved by injecting long chain polymers which are designed to have charged sites along the length of the chain 164. These sites may be charged such that they have an opposite charge to that of the effective particle surface charge. In this way the polymer can bridge together multiple particles creating a larger floc. This requires some degree of mixing to bring the polymer in contact with the particles. Mixing intensity should be high enough to create sufficient interaction of polymer with the particles, but not so excessive to result in shearing of previously formed flocs.

Another process challenge in bottom ash sluice water clarification is the variability of the raw solids feed rate. The solid loading is dependent upon how the bottom ash discharges from the hoppers. This is often an erratic process resulting in periods of high and low solids loading into the clarification equipment. Furthermore, there is usually a gradual decay in solids loading from the beginning to the end of the ash hopper discharge cycle. This makes polymer dosing for flocculation a challenge since there is a band that produces effective flocculation. Too little polymer cannot interact with all the particles, and too much polymer can excessively coat the surfaces of the particles resulting in electrostatic repulsion due to like-charged surfaces of the polymer. Instrumentation to measure the slurry solids concentration for the purpose of controlling polymer dose has not proved reliable for this application. A means to recirculate solids within the clarification equipment would act as a buffer to minimize the impact of variable feed slurries, particularly when the raw solids feed concentration is low.

While the above description constitutes the preferred embodiment of the present invention, it will be appreciated that the invention is susceptible to modification, variation and change without departing from the proper scope and fair meaning of the accompanying claims.

The invention claimed is:

1. A remote submerged chain conveyor system for separating particles from a coal ash/water slurry conveyed from one or more remotely located boiler units, comprising:
a tank forming a dewatering section, an ash holding section and an ash settling section and configured for holding a water column extending across the dewatering section, the ash holding section, and the ash settling section,
the ash holding section being adapted for receiving the slurry and defining first and second opposite ends,
the dewatering section extending from the first end of the ash holding section and including an incline for dewatering the slurry,
the ash settling section extending proximate the second end of the ash holding section from an upstream end of the ash settling section to a downstream end of the ash settling section and forming an elongated vessel with a discharge drain trough at near the downstream end, the dewatering section, the ash holding section, and the ash settling section being oriented in a generally linear arrangement with a net flow of water from the ash/water slurry occurring in a direction from the ash holding section, through the ash settling section, toward the downstream end, and out of the drain trough,
a drag chain moving along the bottom of the ash settling section and of the ash holding section and along the incline of the dewatering section, in a direction from the ash settling section toward the dewatering section;
and a flocculant supply line upstream of the ash settling section configured for adding a flocculant promoting an agglomeration of particles into flocs.

2. The submerged chain conveyor system according to claim 1, further comprising a coagulant supply line for adding a coagulant to the slurry.

3. The submerged chain conveyor system according to claim 2, wherein a coagulant supply line is in fluid connection with a slurry discharge stream prior to the slurry discharge stream entering the ash holding section.

4. The remote submerged chain conveyor system according to claim 1, wherein the flocculant supply line is arranged in a mixing section located between the second end of the ash holding section and the upstream end of the ash settling section.

5. The remote submerged chain conveyor system according to claim 4, wherein the mixing section includes an agitator.

6. The remote submerged chain conveyor system according to claim 5, wherein the agitator is a rotating impeller.

7. The remote submerged chain conveyor system according to claim 5, wherein the agitator produces a core up-flow and an annular down-flow of the slurry.

8. The remote submerged chain conveyor system according to claim 4, further comprising a collection hopper arranged in the mixing section, the collection hopper being arranged underneath the drag chain and connected to a return path from the collection hopper to the mixing section.

9. The remote submerged chain conveyor system according to claim 8, wherein the return path includes a pump for displacing solids from the bottom of the collection hopper to a location in the mixing section that is elevated relative to the agitator.

10. The remote submerged chain conveyor system according to claim 9, wherein the return path includes a suction line of the pump between the collection hopper and the pump that includes flushing nozzles for eliminating clogging of the suction line.

11. The remote submerged chain conveyor system according to claim 4, wherein the mixing section is separated from the ash holding section via a permeable containment plate.

12. The remote submerged chain conveyor according to claim 11, wherein the permeable containment plate includes perforations for containing accumulated particles in the ash holding section.

13. The remote submerged chain conveyor system according to claim 4, wherein the mixing section is separated from the ash setting section via a barrier reducing a cross-section of the net flow from the mixing section to the ash settling section.

14. The remote submerged chain conveyor system according to claim 13, wherein the barrier blocks the net flow from a top portion of the mixing section to the ash settling section and allows the net flow from a bottom portion of the mixing section to the ash settling section.

15. The remote submerged chain conveyor according to claim 1, wherein the drain trough is displaced from the downstream end.

16. The remote submerged chain conveyor according to claim 1 further comprising at least one baffle positioned in the ash settling section between the upstream and downstream ends and extending across the width of the ash settling section and from a lower portion of the ash settling section within the water column retained in the ash settling section.

17. The remote submerged chain conveyor according to claim 1 further comprising at least one array of stacked plates in the ash settling section.

18. The remote submerged chain conveyor according to claim 17 further comprising at least a first and a second array of the stacked plates separated from one another longitudinally along the settling zone and at least one baffle between the first and the second array of the stacked plates, the baffle extending from a lower region of the ash settling section in the water column toward the upper level of the water column contained in the ash settling section, the baffle breaking up bottom currents along the bottom of the drain trough.

19. A remote submerged chain conveyor system for separating particles from a coal ash/water slurry conveyed from one or more remotely located boiler units, comprising:
a tank forming a dewatering section, an ash holding section, a mixing section, and an ash settling section and configured for holding a water column extending across the dewatering section, the ash holding section, the mixing section, and the ash settling section, the ash holding section being adapted for receiving the slurry and defining first and second opposite ends, the dewatering section extending from the first end of the ash holding section and including an incline for dewatering the slurry, the mixing section extending from a proximal end adjacent to the second end of the ash holding section to a distal end of the mixing section and including an agitator and a flocculant supply line configured for adding a flocculant promoting an agglomeration of particles into flocs;

the ash settling section extending from an upstream end of the ash settling section at the distal end of the mixing section to a downstream end of the ash settling section and forming an elongated vessel with a discharge drain trough at near the downstream end, the dewatering section, the ash holding section, and the ash settling section being oriented in a generally linear arrangement with a net flow of water from the ash/water slurry occurring in a direction from the ash holding section, through the ash settling section, toward the downstream end, and out of the drain trough, a drag chain moving along the bottom of the ash settling section and of the ash holding section and along the incline of the dewatering section, in a direction from the ash settling section toward the dewatering section.

* * * * *